United States Patent
Mae et al.

(10) Patent No.: US 8,290,340 B2
(45) Date of Patent: Oct. 16, 2012

(54) INFORMATION PROCESSING APPARATUS, INFORMATION PROCESSING METHOD, AND COMPUTER PROGRAM

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 795 days.

(21) Appl. No.: 11/988,516

(22) PCT Filed: May 7, 2007

(86) PCT No.: PCT/JP2007/059449
§ 371 (c)(1),
(2), (4) Date: Jun. 11, 2009

(87) PCT Pub. No.: WO2007/129684
PCT Pub. Date: Nov. 15, 2007

(65) Prior Publication Data
US 2009/0262612 A1    Oct. 22, 2009

(30) Foreign Application Priority Data
May 10, 2006 (JP) ................ P2006-132015

(51) Int. Cl.
*H04N 9/80* (2006.01)
(52) U.S. Cl. .................................... 386/248; 386/239
(58) Field of Classification Search ................... None
See application file for complete search history.

(56) References Cited

U.S. PATENT DOCUMENTS

| | | | |
|---|---|---|---|
| 2004/0213552 A1 | 10/2004 | Kato | |
| 2004/0252982 A1* | 12/2004 | Iwahara et al. | 386/111 |
| 2005/0100308 A1* | 5/2005 | Moteki | 386/4 |
| 2005/0105893 A1* | 5/2005 | Kikuchi et al. | 386/95 |
| 2006/0050778 A1 | 3/2006 | Aridome et al. | |
| 2006/0051066 A1 | 3/2006 | Aridome et al. | |
| 2006/0064716 A1* | 3/2006 | Sull et al. | 725/37 |
| 2006/0083489 A1 | 4/2006 | Aridome et al. | |
| 2006/0116780 A1* | 6/2006 | Kobayashi et al. | 700/94 |
| 2006/0233458 A1 | 10/2006 | Kikuchi et al. | |

FOREIGN PATENT DOCUMENTS

| | | |
|---|---|---|
| JP | 2003-006979 A | 1/2003 |
| JP | 3675464 B2 | 7/2005 |
| JP | 3675465 B2 | 7/2005 |
| JP | 3807400 B2 | 8/2006 |
| JP | 2006-302346 A | 11/2006 |
| WO | WO-2006/109717 A1 | 10/2006 |

* cited by examiner

*Primary Examiner* — William C Vaughn, Jr.
*Assistant Examiner* — Eileen Adams
(74) *Attorney, Agent, or Firm* — Lerner, David, Littenberg, Krumholz & Mentlik, LLP

(57) ABSTRACT

An apparatus and a method for quickly starting recording seamless-playable data are provided. At the end of recording a preceding record content, identification information of a clip information file for a subsequent record content to be recorded next is recorded in an attribute information storage file set for the preceding record content. More specifically, a clip information file for a subsequent chapter is reserved at the end of recording of a preceding chapter, and an identifier of the clip information file is recorded in the clip information file for the preceding record chapter. Through the prior reservation process of the clip information file, an updating process for updating the clip information file at the start of recording of the subsequent chapter becomes unnecessary. Data recording, such as a photographing operation of a video camera is thus quickly started.

15 Claims, 18 Drawing Sheets

FIG. 11

| Syntax | No. of bits | Mnemonic |
|---|---|---|
| Clip_information_file( | | |
|   TypeIndicator | 8*4 | bslbf |
|   TypeIndicator2 | 8*4 | bslbf |
|   SequenceInfoStartAddress | 32 | uimsbf |
|   ProgramInfoStartAddress | 32 | uimsbf |
|   CPIStartAddress | 32 | uimsbf |
|   ClipMarkStartAddress | 32 | uimsbf |
|   ExtensionDataStartAddress | 32 | uimsbf |
|   reserved | 96 | bslbf |
|   blkClipInfo() | | |
|   for(i=0;i<N1;i++){ | | |
|     padding_word | 16 | bslbf |
|   } | | |
|   blkSequenceInfo() | | |
|   for(i=0;i<N2;i++){ | | |
|     padding_word | 16 | bslbf |
|   } | | |
|   blkProgramInfo() | | |
|   for(i=0;i<N3;i++){ | | |
|     padding_word | 16 | bslbf |
|   } | | |
|   blkCPI() | | |
|   for(i=0;i<N4;i++){ | | |
|     padding_word | 16 | bslbf |
|   } | | |
|   blkClipMark() | | |
|   for(i=0;i<N5;i++){ | | |
|     padding_word | 16 | bslbf |
|   } | | |
|   blkExtensionData() | | |
|   for(i=0;i<N6;i++){ | | |
|     padding_word | 16 | bslbf |
|   } | | |
| } | | |

FIG. 12

| Syntax | No. of bits | Mnemonic |
|---|---|---|
| blkClipInfo() { | | |
|    Length | 32 | uimsbf |
|    reserved | 16 | bslbf |
|    ClipStreamType | 8 | bslbf |
|    ApplicationType | 8 | bslbf |
|    reserved | 31 | bslbf |
|    isCC5 | 1 | bslbf |
|    TSRecordingRate | 32 | uimsbf |
|    NumberOfSourcePackets | 32 | uimsbf |
|    reserved | 1024 | bslbf |
|    TSTypeInfoBlock() | | |
|    if(IsCC5=1<sub>b</sub>) { | | |
|      reserved | 8 | bslbf |
|      FollowingClipStreamType | 8 | bslbf |
|      reserved | 32 | bslbf |
|      FollowingClipInformationFileName | 8*5 | bslbf |
|      ClipCodecIdentifier | 8*4 | bslbf |
|      reserved | 8 | bslbf |
|    } | | |
| } | | |

FIG. 13

| Syntax | No. of bits | Mnemonic |
|---|---|---|
| Movie PlayList File{ | | |
|   TypeIndicator | 8*4 | bslbf |
|   TypeIndicator2 | 8*4 | bslbf |
|   PlayListStartAddress | 32 | uimsbf |
|   PlaylistMarkStartAddress | 32 | uimsbf |
|   ExtensionDataStartAddress | 32 | uimsbf |
|   reserved | 160 | bslbf |
|   blkApplicationPlayList() | | |
|   for (i=0;i<N1;i++){ | | |
|     padding_word | 16 | bslbf |
|   } | | |
|   blkPlayList() | | |
|   for (i=0;i<N2;i++){ | | |
|     padding_word | 16 | bslbf |
|   } | | |
|   blkPlayListMark() | | |
|   for (i=0;i<N3;i++){ | | |
|     padding_word | 16 | bslbf |
|   } | | |
|   blkExtensionData() | | |
|   for (i=0;i<N4;i++){ | | |
|     padding_word | 16 | bslbf |
|   } | | |
| } | | |

FIG. 14

| Syntax | No. of bits | Mnemonic |
|---|---|---|
| blkPlayList() { | | |
|   Length | 32 | uimsbf |
|   reserved | 16 | bslbf |
|   NumberOfPlayItems | 16 | uimsbf |
|   NumberOfSubPaths | 16 | uimsbf |
|   for(PlayItem_id=0; PlayItem_id<NumberOfPlayItem_id++{ | | |
|     blkPlayItem() | | |
|   } | | |
|   for(SubPath_id=0; SubPath_id<NumberOfSubPaths_id++) { | | |
|     blkSubPath() | | |
|   } | | |
| } | | |

FIG. 15

| Syntax | No. of bits | Mnemonic |
|---|---|---|
| blkPlayItem() { | | |
|   Length | 16 | uimsbf |
|   ClipInformationFileName | 8*5 | bslbf |
|   ClipCodecIdentifier | 8*4 | bslbf |
|   reserved | 12 | bslbf |
|   ConnectionCondition | 4 | bslbf |
|   RefToSTCID | 8 | uimsbf |
|   INTime | 32 | uimsbf |
|   OUTTime | 32 | uimsbf |
|   blkUOMaskTable() | | |
|   PlayItemRandomAccessFlag | 1 | bslbf |
|   reserved | 7 | bslbf |
|   StillMode | 8 | bslbf |
|   if(StillMode==0x01) { | | |
|     StillTime | 16 | uimsbf |
|   } else { | | |
|     reserved | 16 | bslbf |
|   } | | |
|   blkSTNTable() | | |
| } | | |

421

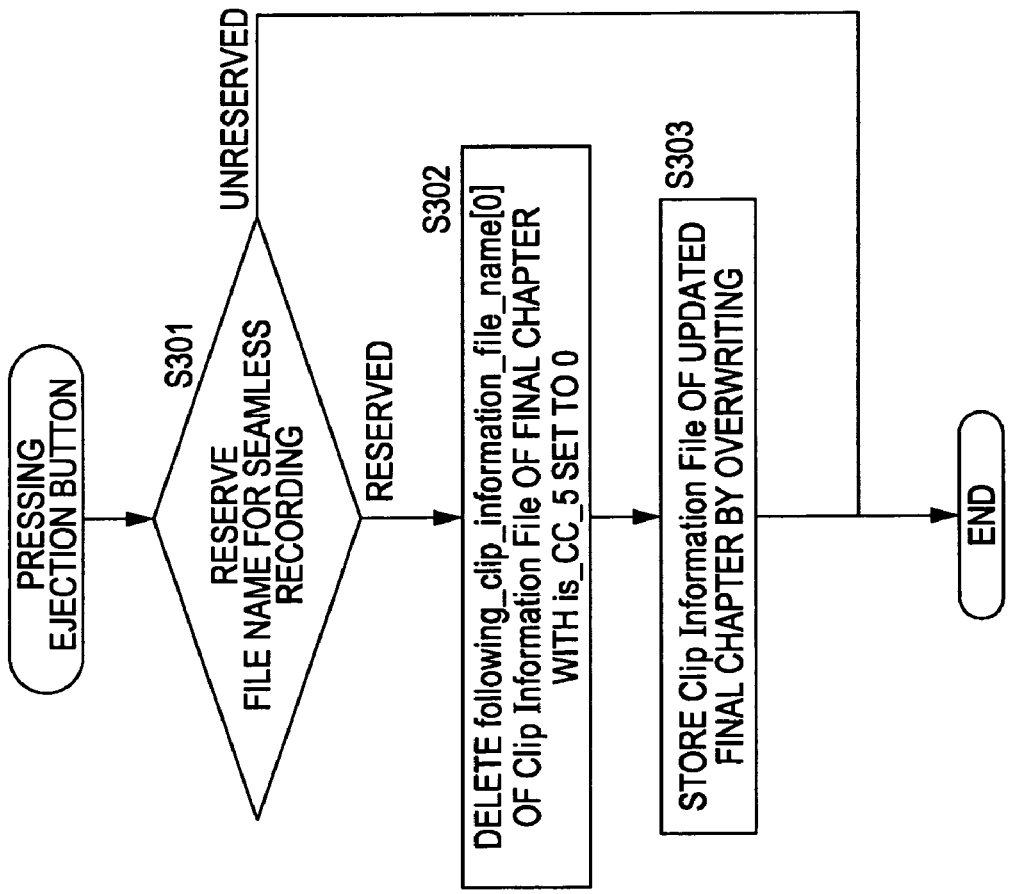

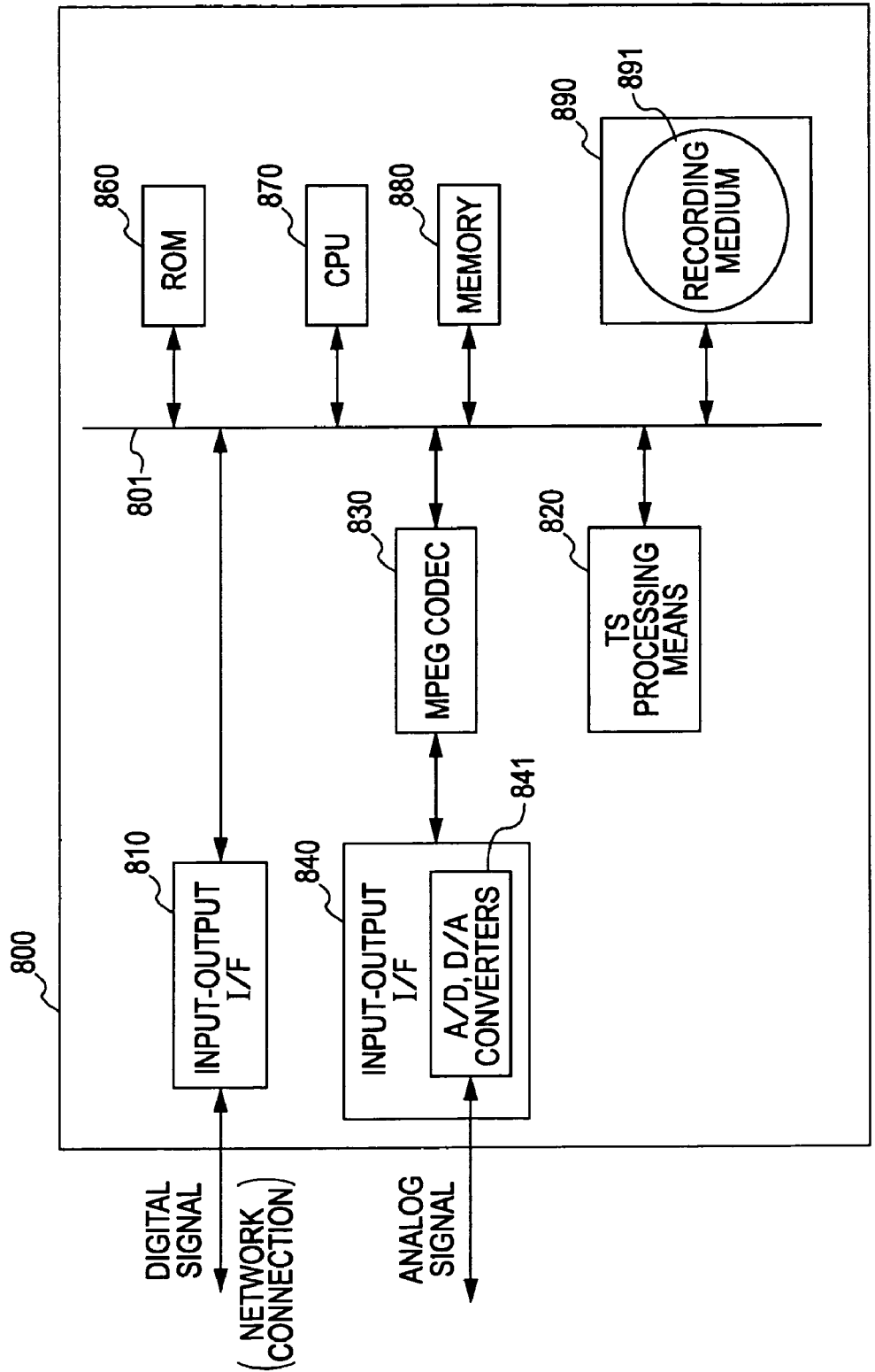

INFORMATION PROCESSING APPARATUS, INFORMATION PROCESSING METHOD, AND COMPUTER PROGRAM

CROSS-REFERENCES TO RELATED APPLICATIONS

The present application is a national phase entry under 35 U.S.C. §371 of International Application No. PCT/JP2007/059449 filed May 7, 2007, published on Nov. 15, 2007 as WO 2007/129684 A1, which claims priority from Japanese Patent Application No. JP 2006-132015 filed in the Japanese Patent Office on May 10, 2006.

TECHNICAL FIELD

The present invention relates to an information processing apparatus, an information processing method and a computer program for recording data that is to be played in a seamless fashion. More specifically, the present invention relates to an information processing apparatus, an information processing method and a computer program for quickly starting data recording by simplifying a data recording start process, namely, by performing a file reservation process for recording an attribute information storage file for data to be recorded next, when data recording is completed on an information recording medium.

BACKGROUND ART

As recording capacity of disk-type recording media increases, video cameras of a type storing a moving image on a disk instead of a known recording tape become available (see Patent Document 2). Since the disk-type recording media permit random accessing, a desired scene may be quickly found. Since data accessing is performed on the disk-type media in a contactless fashion, the media is free from wear. For example, more and more users accept DVD video cameras because of ease of use thereof such as high image quality and easy-to-edit feature.

In a reading process or a playing process of a content stored on an information recording medium such as a disk, a data reading process from the information recording medium, an storage process of the read data onto a buffer in a codec, an acquisition and decoding process of acquiring accumulated data from the buffer in the codec and decoding the acquired data are performed. The codec includes an encoder encoding data and a decoder decoding the encoded data. The codec thus performs an encoding process and a decoding process.

When the data read from the information recording medium is accumulated on the buffer in the codec, an overflow can occur on the internal buffer of the codec in the above series of process steps. For this reason, a control process is performed so that a preceding stream is reproduced first, followed by the reproduction of a subsequent stream. Under this process, play contents may be interrupted, in other words, freeze occurs.

If certain conditions are satisfied, continuous playing becomes possible without freezing across a plurality of streams. A play process for continuously playing a plurality of streams is referred to as seamless playing. One technique to perform seamless playing is a data recording process. In the data recording process, an encode operation for the seamless playing is performed when a video camera is used to take pictures.

More specifically, when contents are recorded at discontinued recording timings, seamless information applicable to data recording is stored to perform the seamless playing. The seamless information contain buffer status information and time stamp at a record end point of a preceding record stream. When a subsequent stream is recorded, the seamless information is acquired. A codec performing an encode process at the start of recording the subsequent stream thus acquires the seamless information containing the buffer status information at the end of the recording of the preceding stream. The encode process is thus performed so that a predetermined buffer model may not be destroyed. The streams thus seamless playable can be recorded.

Information permitting seamless playing and applicable during data recording is referred to as seamless information. The seamless information may be stored on a memory such as a RAM of an information processing apparatus such as a video camera. At the next data recording, the seamless information may be read so that seamless playable streams are recorded. Patent Document 1 discloses a technique in which data is recorded in a manner such that the data may be seamless played with the buffer status information used.

For example, by referencing an identifier of a subsequent stream, identification information of the subsequent stream is written in a preceding clip information file.

When content recording is performed at discontinued recording timings, a write process of identification information of a subsequent content needs to be performed to management information of a preceding content before a recording operation of a subsequent content is completed. When the recording operation of the subsequent content starts, the write process is performed as a process prior to the start of the recording operation of the subsequent content. The recording operation of the subsequent content can be started only after the end of an identifier recording operation. As a result, time is needed before the start of the recording operation of the content. For example, if such a process is performed on a video camera, photo opportunity may be lost.

[Patent Document 1]
Japanese Patent 3675464

DISCLOSURE OF INVENTION

Problems to be Solved by the Invention

In view of the above problems, the present invention has been developed, and it is an object of the present invention to provide an information processing apparatus, an information processing method and a computer program for quickly starting data recording by simplifying a data recording start process, namely, by performing a file reservation process for recording an attribute information storage file for data to be recorded next, when data recording is completed on an information recording medium.

Means for Solving the Problems

In accordance with a first aspect of the present invention,
an information processing apparatus for recording a record content onto an information recording medium, includes
an encoder for performing an encoding operation on the record content,
a data processor for performing a conversion operation for converting encoded data on the encoder into data having a predetermined record format, and a recording processor for recording onto the information recording medium the data having the predetermined record format generated by the data processor.

At the end of a recording operation of a preceding record content, the data processor performs a control operation, recording, in an attribute information storage file for the preceding record content, identification information of an attribute information storage file for a subsequent record content to be recorded next.

In accordance with one embodiment of the information processing apparatus of the present invention, at the end of the recording operation of the preceding record content, the data processor performs the control operation, recording in the attribute information storage file for the preceding record content, information indicating that the attribute information storage file for the subsequent record content to be recorded next and the attribute information storage file for the preceding record content are connected in a seamless fashion and the identification information of the subsequent attribute information storage file.

In accordance with one embodiment of the information processing apparatus of the present invention, the data processor may perform the control operation, converting the encoded data into a record content having a record format, the record format containing a content file of the record content having a predetermined unit, an attribute information storage file mapping play time information of the content file to address information and a play list file composed of at least one piece of play period data specifying a play period of the record content by a start point and an end point, and recording the converted record content in the record format on the information recording medium.

In accordance with one embodiment of the information processing apparatus of the present invention, the data processor may delete the identification information of the subsequent attribute information storage file recorded in the attribute information storage file for last record content recorded on the information recording medium if seamless information for seamless playing stored on a memory of the information processing apparatus is to be deleted.

In accordance with one embodiment of the information processing apparatus of the present invention, the seamless information may include accumulated data amount information of an internal buffer of the encoder at the end of the recording operation of the preceding record content, and time stamp information set in response to the record format generated by the data processor.

In accordance with one embodiment of the information processing apparatus of the present invention, the seamless information may include a presentation time stamp (PTS), a decoding time stamp (DTS) and a system clock reference (SCR) as reference time information, each defined in the MPEG format.

In accordance with one embodiment of the information processing apparatus of the present invention, the seamless playing may be performed with the seamless information applied in a STD (System Target Decoder) in an AVCHD format.

In accordance with a second aspect of the present invention, an information processing method of an information processing apparatus for recording a record content onto an information recording medium, includes an encoding step of an encoder of performing an encoding operation on the record content, a data processing step of a data processor of performing a conversion operation for converting data encoded in the encoding step into data having a predetermined record format, a recording processing step of a recording processor of recording onto the information recording medium the data having the predetermined record format generated in the data processing step, and at the end of a recording operation of a preceding record content, a file identification information recording step of the data processor of performing a control operation, recording, in an attribute information storage file for the preceding record content, identification information of an attribute information storage file for a subsequent record content to be recorded next.

In accordance with one embodiment of the information processing method of the present invention, the information processing method may further include a step of the data processor of performing the control operation, at the end of the recording operation of the preceding record content, by recording, in the attribute information storage file for the preceding record content, information indicating that the attribute information storage file for the subsequent record content to be recorded next and the attribute information storage file for the preceding record content are connected in a seamless fashion and the identification information of the subsequent attribute information storage file.

In accordance with one embodiment of the information processing method of the present invention, the information processing method may further include a step of the data processor of performing the control operation, by converting the encoded data into a record content having a record format, the record format containing a content file of the record content having a predetermined unit, the attribute information storage file mapping play time information of the content file to address information and a play list file composed of at least one piece of play period data specifying a play period of the record content by a start point and an end point, and by recording the converted record content in the record format on the information recording medium.

In accordance with one embodiment of the information processing method of the present invention, the information processing method may further include a step of the data processor of deleting the identification information of the subsequent attribute information storage file recorded in the attribute information storage file for last record content recorded on the information recording medium if seamless information for seamless playing stored on a memory of the information processing apparatus is to be deleted.

In accordance with one embodiment of the information processing method of the present invention, the seamless information may include accumulated data amount information of an internal buffer of the encoder at the end of the recording operation of the preceding record content, and time stamp information set in response to the record format generated by the data processor.

In accordance with one embodiment of the information processing method of the present invention, the seamless information may include a presentation time stamp (PTS), a decoding time stamp (DTS) and a system clock reference (SCR) as reference time information, each defined in the MPEG format.

In accordance with one embodiment of the information processing method of the present invention, the seamless playing may be performed with the seamless information applied in a STD (System Target Decoder) in an AVCHD format.

In accordance with a third aspect of the present invention, a computer program for causing an information processing apparatus to perform a content recording process onto an information recording medium, includes an encoding step of an encoder of performing an encoding operation on the record content, a data processing step of a data processor of performing a conversion operation for converting data encoded in the encoding step into data having a predetermined record format, a recording processing step of a recording processor of recording onto the information recording medium the data having the predetermined record format generated in the data processing step, and at the end of a recording operation of a preceding record content, a file identification information recording step of the data processor of performing a control operation, recording, in an attribute information storage file for the preceding record content, identification information of an attribute information storage file for a subsequent record content to be recorded next.

The computer program of the present invention may be supplied in a computer-readable form in a recording medium or a communication medium to a computer system that can execute a variety of program codes. The recording media include a CD, FD, or MO, and the communication media include a network. By supplying the program in a computer readable form, the compute system can perform processes responsive to the program.

These and other objects, features and advantages of the present invention will become apparent from the description of the embodiments of the present invention and the accompanying drawings. In the specification, the word system refers to a logical set of a plurality of apparatuses and is not necessarily limited to elements housed in a single casing.

Advantages

In accordance with the present invention, when an information processing apparatus such as a video camera performs a recording process of contents at discontinued recording timings, the identification information of the clip information file for the subsequent record content to be recorded next is recorded in the attribute information storage file set for the preceding record content at the end of recording the preceding record content. More specifically, a clip information file for a subsequent chapter is reserved at the end of recording of a preceding chapter, and an identifier of the clip information file is recorded in the clip information file for the preceding record chapter. Through the prior reservation process of the clip information file, an updating process for updating the clip information file at the start of recording of the subsequent chapter becomes unnecessary. Data recording, such as a photographing operation of a video camera is thus quickly started.

BRIEF DESCRIPTION OF THE DRAWINGS

FIG. 11 illustrates syntax of a structure of a clip information file.

FIG. 12 illustrates syntax of a clip information block [ClipInfo( )] of the clip information file.

FIG. 13 illustrates syntax of one example of the play list file.

FIG. 14 illustrates syntax of a play list information field [PlayList( )] as structural data of the play list file.

FIG. 15 illustrates syntax of play item information [PlayItem( )] contained in the play list information field [PlayList( )] as structural data of the play list file.

FIG. 17 is a flowchart illustrating a file update process sequence for deleting an identifier of the clip information file.

FIG. 18 illustrates a structure of an information processing apparatus.

BEST MODE FOR CARRYING OUT THE INVENTION

An information processing apparatus, an information processing method and a computer program of the present invention are described below with reference to the drawings. The invention is described element by element in the following order:

1. System structure
2. Data format
3. Summary of typical recording process of seamless playable content data
4. Detail of the recording process of the seamless playable content data in accordance with one embodiment of the present invention
5. Structure of the information processing apparatus

[1. System Structure]

Figure 1:
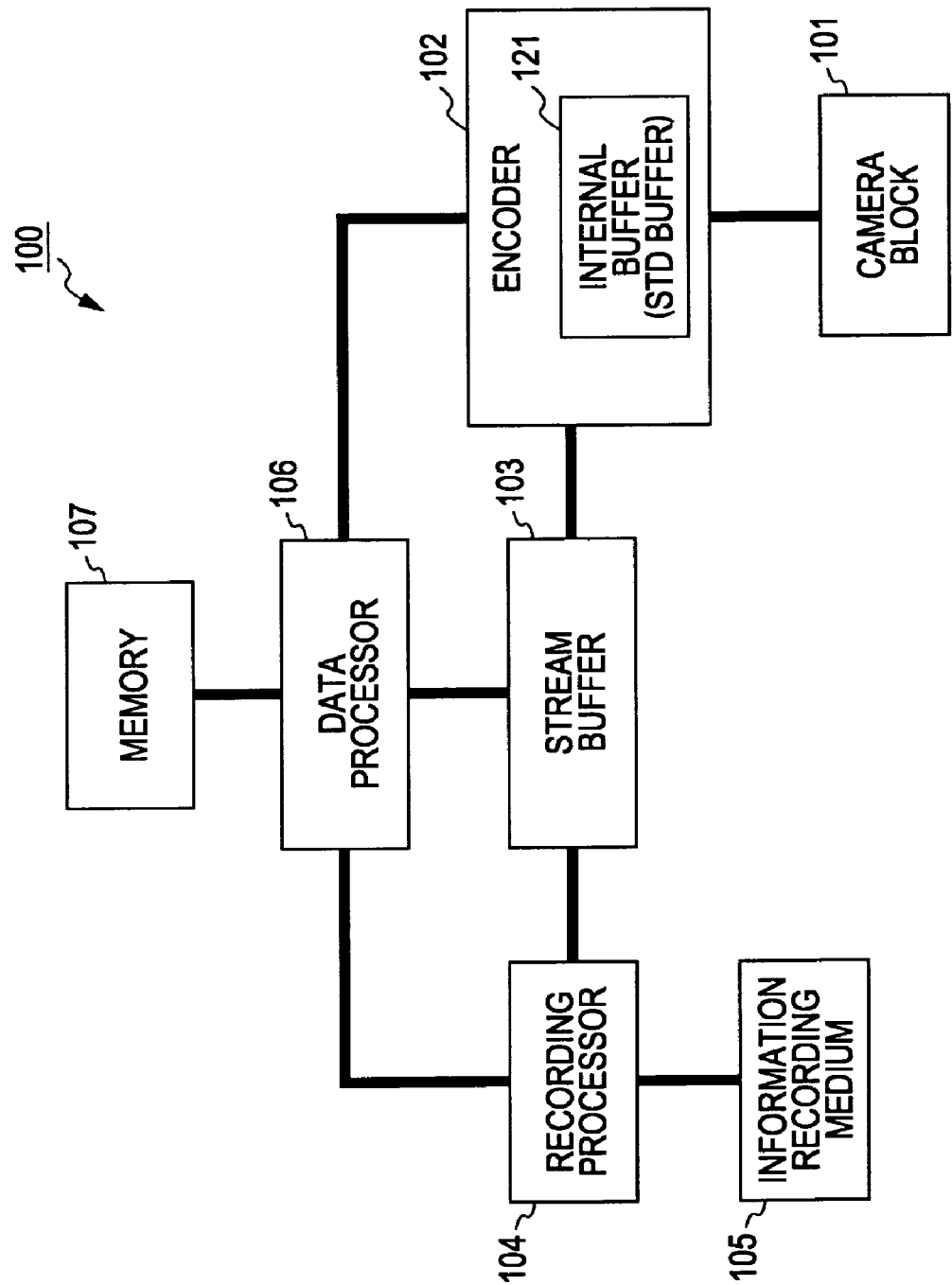
FIG. 1 is a block diagram illustrating a structure of an information processing apparatus of the present invention.

FIG. 1 diagrammatically illustrates a functional structure of an information processing apparatus 100 in accordance with one embodiment of the present invention. FIG. 1 illustrates a video camera as one example of the information processing apparatus 100. As shown in FIG. 1, the information processing apparatus 100 includes a camera block 101, an encoder 102, a stream buffer 103, a recording processor 104, an information recording medium 105, a data processor 106 and a memory 107. The encoder 102 includes internal buffer (STD (System Target Decoder) buffer) 121.

The camera block 101 performs a photoelectric conversion process for converting a light signal input via a lens into an electrical signal and an A/D conversion process, thereby converting photograph data into digital data. The camera block 101 inputs the digital data to the encoder 102. The encoder 102 performs an encode process in accordance with MPEG-4 Part 10 Advanced Video Coding (AVC). During the encoding process, the internal buffer (STD buffer) 121 is used as a temporary accumulator of data.

Moving image data encoded by the encoder 102 is temporarily stored on the stream buffer 103. The data from the stream buffer 103 is formatted by the data processor 106. The recording processor 104 records the formatted data onto the information recording medium 105. The data processor 106 is a controller having a CPU. The data processor 106 functions as a recording controller generally controlling processes performed by the encoder 102, the recording processor 104, etc. The data processor 106 converts the encoded data into data in MPEG2-TS (Transport Stream) in order to perform a data recording process in AVCHD format on the information recording medium 105. The memory 107 stores a program necessary for the data processor 106 to operate. The memory 107 is thus a memory temporarily storing information for control. For example, the memory 107 may include a volatile memory such as SD-RAM (Random Access Memory) or a non-volatile memory such as a flash memory.

FIG. 1 illustrates a structure of the video camera as one example of the information processing apparatus of the present invention. The information processing apparatus of the present invention is not necessarily a video camera. The information processing apparatus may be an apparatus that records data onto an information recording medium. For example, the information processing apparatus may perform a recording process on a medium (information recording medium) by receiving a moving image stream from a transmission medium such as a LAN. The information recording medium 105 may be one of a variety of recording media including Blu-ray Disc (BD), DVD, HDD, and a semiconductor memory. The type of medium is not important as long as the information recording medium 105 can record data in accordance with a predetermined format such as AVCHD and has a sufficient recording capacity.

The stream buffer 103 is partitioned into two areas, one area storing elementary streams of video and audio (hereinafter referred to as video ES or audio ES) produced by the encoder 102 and the other area storing a transport stream (hereinafter referred to as TS) MPEG2-TS formatted to be data recorded in the AVCHD format. The transport stream (TS) includes a plurality of transport (TS) packets, each having a fixed length packet of 188 bytes. The TS packet includes a packet header having a 4 byte fixed length, an adaptation field and a payload.

When the encoded data is converted to MPEG2-TS format data, the data processor 106 adds PTS, DTS and SCR of the video and audio as time information used in a playing process.

PTS (Presentation Time Stamp) and DTS (Decoding Time Stamp) are time stamps as time information for play timing and decode process timing, and are set as attribute information for stream data. SCR (System Clock Reference) serves as reference time information.

In the course of converting the encoded data into MPEG2-TS format data in a standard data recording process, the data processor 106 successively increases these values of the time information from appropriate initial values thereof set for respective apparatuses while attaching the values to the TS. For example, in a standard photographing process of the video camera, the encoder 102 updates, in response to encode results, buffer amounts of buffer models from the initial values of a video buffer amount and an audio buffer amount of a STD (System Target Decoder) model set for each apparatus.

The encoder 102 thus controls a buffer accumulated amount so that the buffer model is not destroyed. To record the moving image to be seamless played, the seamless information is stored. The seamless information contains PTS, DTS and SCR of a last moving image previously photographed and accumulated information of internal buffer (STD buffer) 121 in the encoder. When a next data recording process (photographing process) is performed, the seamless information is acquired. The encode process is then performed so that a buffer model such as a STD buffer model is not destroyed. The stream data permitting seamless playing is thus recorded. Separate internal buffers (STD buffers) 121 may be set for respectively video and audio.

At the end of the recording of one stream, the encoder 102 calculates, for each of video and audio, last buffer amounts of the internal buffer (STD buffer) 121 and notifies the data processor 106 of last buffer amounts of the video and audio. The data processor 106 causes the memory 107 to store the last accumulation amount of the internal buffer (STD buffer) 121 supplied from the encoder 102 and the time information composed of last video PTS, DTS, audio PTS, and SCR produced at the conversion to the MPEG2-TS format.

At the start of a next photograph operation, the data processor 106 acquires the seamless information from the memory 107 and notifies the encoder 102 of the seamless information. The encoder 102 can thus perform the encode process with last buffer amount of the internal buffer (STD buffer) 121 set as an initial value. The data processor 106 can thus perform the MPEG2-TS format conversion process with the PTS, DTS and SCR of each of the video and audio contained in the seamless information set as the initial values. Data enabling seamless playing is thus recorded.

[2. Data Format]

Figure 2:
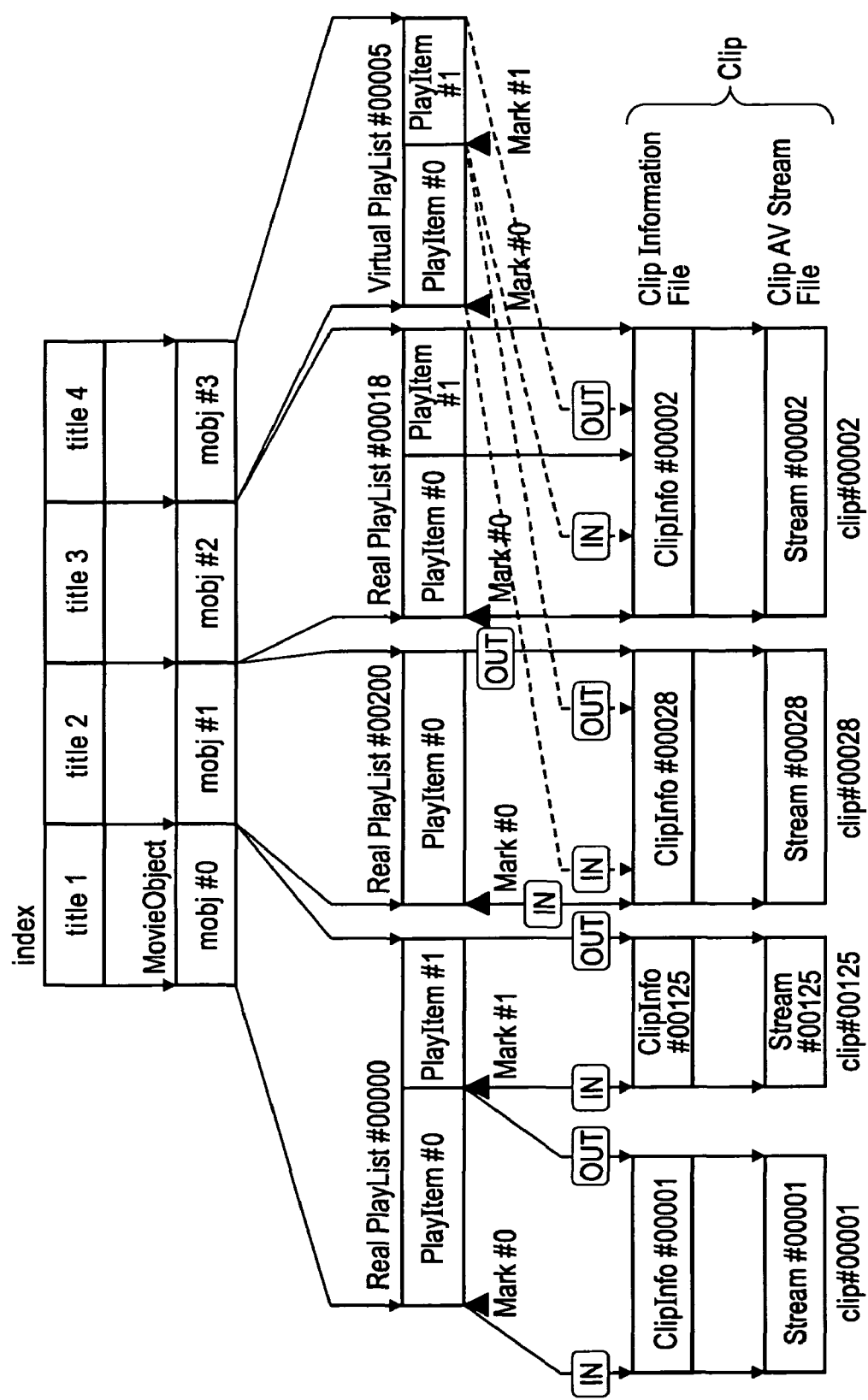
FIG. 2 illustrates a data structure of record data in the information processing apparatus.

FIG. 2 illustrates an example of a data structure to record data on the information recording medium 105. In the following discussion, data recording in accordance with the AVCHD format is described. As shown, when the moving image stream captured by the video camera is encoded into an MPEG2-TS format stream, an index file, a movie object (MovieObject) file, a play list (PlayList) file, a clip information (ClipInformation) file, and a clip AV stream (ClipAVStream) file are recorded. A clip AV stream file having a predetermined data unit and a clip information file corresponding thereto are collectively referred to as a clip. Each of the files is described in detail below.

[2. Data Format]

FIG. 2 illustrates an example of a data structure to record data on the information recording medium 105. In the following discussion, data recording in accordance with the AVCHD format is described. As shown, when the moving image stream captured by the video camera is encoded into an MPEG2-TS format stream, an index file, a movie object (MovieObject) file, a play list (PlayList) file, and a clip file are recorded. The clip contains a clip information file (ClipInformation) file and a clip AV stream (ClipAVStream) file. Each file is described in detail below.

TABLE 1

| File type | Maximum number | Function |
| --- | --- | --- |
| Index | 1 | Base file managing the entire medium, namely, managing correspondence between title to be displayed to user and MovieObject. In HD-AVC format, play order of playlist to be managed in MovieObject file is managed within metadata of index file. |

TABLE 1-continued

| File type | Maximum number | Function |
|---|---|---|
| MovieObject | 1 | In BD-ROM format, MovieObject file manages playlist played when title is specified. In HD-AVC format, however, MovieObject is not referenced, and relation between playlist and title is managed by metadata in index file. |
| Real PlayList | 2000 in total | Playlist of original title. Registered in the order of recording of recorded video or played video. |
| Virtual Playlist | | Playlist for producing user-defined playlist in non-destructive editing. Having no clip for the virtual playlist itself but specifying clip registered in real playlist for playing. |
| Clip Information | 4000 | Paired with Clip AV Stream and containing information related to stream required to play actual stream. |
| Clip AV Stream | 4000 | Stored in stream recorded in MPEG2-TS. AVC image data stored in this file. |

The whole information recording medium 105 is managed in a file type layer of index. An index file is produced for each title to be displayed to a user. The index file manages a correspondence relationship with a MovieObject file. In the AVCHD format, the play order to be managed by the MovieObject file is actually managed in metadata. When an information recording medium is loaded on a player, the index file is first read and the user can see the title described in the index file.

The MovieObject file manages a playlist to be played. A reference to the MovieObject file is listed in the index file as an entrance to the title. In the AVCHD format, however, the relationship between the PlayList and the title is managed by the metadata in the index file without referencing the MovieObject file.

The PlayList is arranged for each title to be displayed to the user, and contains at least one PlayItem. Each PlayItem contains a play start point (IN point) and a play end point (OUT point) for each clip, thereby specifying a play period. By arranging a plurality of PlayItems within the PlayList along time axis, the play order in the play period may be specified. PlayItems referencing different clips may be contained in a single PlayList.

The reference relationship between the clip and the PlayList may be optionally set. For example, a single clip may be referenced by two PlayLists different in IN point and OUT point. The reference relationship between the title and MovieObject may be optionally set. PlayLists are divided into RealPlayLists and VirtualPlayLists depending on the reference relationship thereof with clips.

The RealPlayList is a PlayList for an original title and is recorded in the record order of PlayItems of a video stream recorded or photographed by the video camera.

The VirtualPlayList is used to produce a user-defined PlayList through non-destructive editing. The VirtualPlayList has no clip (AV stream) thereof, and a PlayItem therewithin indicates a clip or a portion of the clip registered in a RealPlayList. More specifically, the user extracts a needed play period from a plurality of clips and collects PlayItems pointing to the play period, thereby editing the VirtualPlayList.

The ClipAVStream file contains a stream recorded in the MPEG-TS format on the information recording medium 105. Image data is stored in this file.

The ClipInformation file, paired with the ClipAVStream file, contains information relating to a stream required to play an actual stream.

As described above, the index file, the movie object (MovieObject) file, the play list (PlayList) file, the clip information (ClipInformation) file and the AV stream (ClipAVStream) file are generated in accordance with the AVCHD format.

The names of these files and data are examples only, and different names can be used. The content of each file and data are listed as below.

(1) AV stream (ClipAVStream): Content data (2) Clip information (ClipInformation): The clip information has one-to-one correspondence with the AV stream and the ClipInformation file defines attribute of the corresponding AV stream. (For example, coding, size, time to address conversion, play management information, time map, etc. are contained in this file.)

(3) Play item (PlayItem): Data specifying a play period by a play start point and a play end point to the clip information (ClipInformation).

(4) Play list (PlayList): Each play list is composed at least one play item (PlayItem).

(5) Mark: Mark is typically present in the play list (PlayList) and indicates time position in the play content. Generally, a duration from one mark to a next mark is referred to as a chapter.

(6) Movie object (MovieObject): Set of commands for controlling playing.

(7) Title: Set of play lists (recognizable by the user).

Data and files having the above contents are described as the AV stream (ClipAVStream), the clip information (ClipInformation), the play item (PlayItem), the play list (PlayList), the mark, the movie object (MovieObject), and the title. The present invention is also applicable to data and files having contents substantially identical to those described above.

Figure 3:
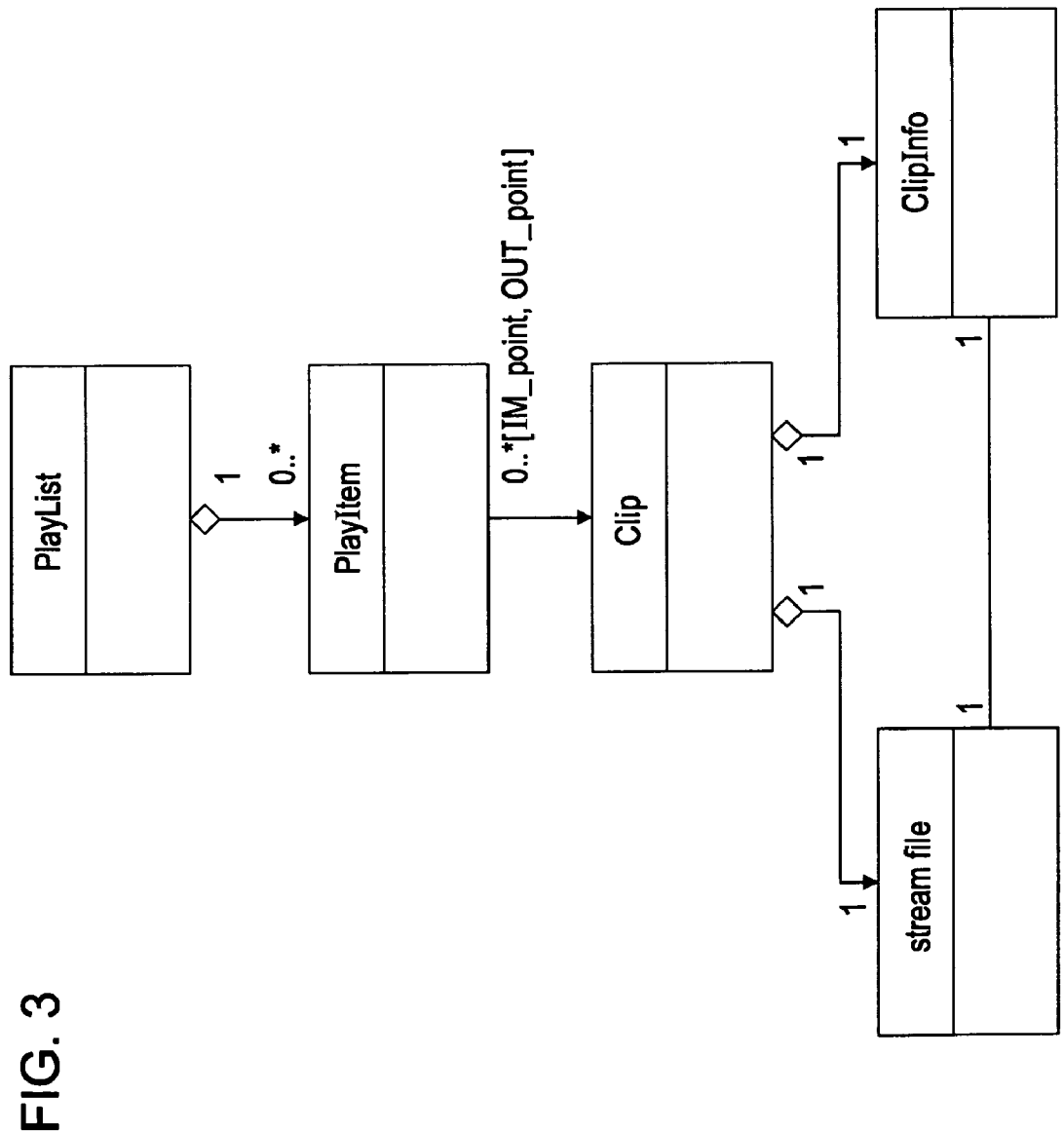
FIG. 3 illustrates UML (Unified Modeling Language) indicating relationship of a play list (PlayList), a play item (PlayItem), a clip, clip information (ClipInformation) and a clip AV stream (ClipAVStream).

FIG. 3 illustrates UML (Unified Modeling Language) indicating the relationship of the play list (PlayList), the play item (PlayItem), the clip, the clip information (ClipInformation), the clip AV stream (ClipAVStream) described with reference to FIG. 2. The play list is mapped to one or a plurality of play items, and each play item is mapped to one clip. One clip can map to a plurality of play items different in start point and/or end point. One clip AV stream file can be referenced from one clip. Similarly, one clip information file can be referenced from one clip. The clip AV stream file and the clip information file have one-to-one correspondence to each other. By defining this structure, play order is specified in a non-destructive fashion with any portion extracted without modifying the clip AV stream file.

Figure 4:
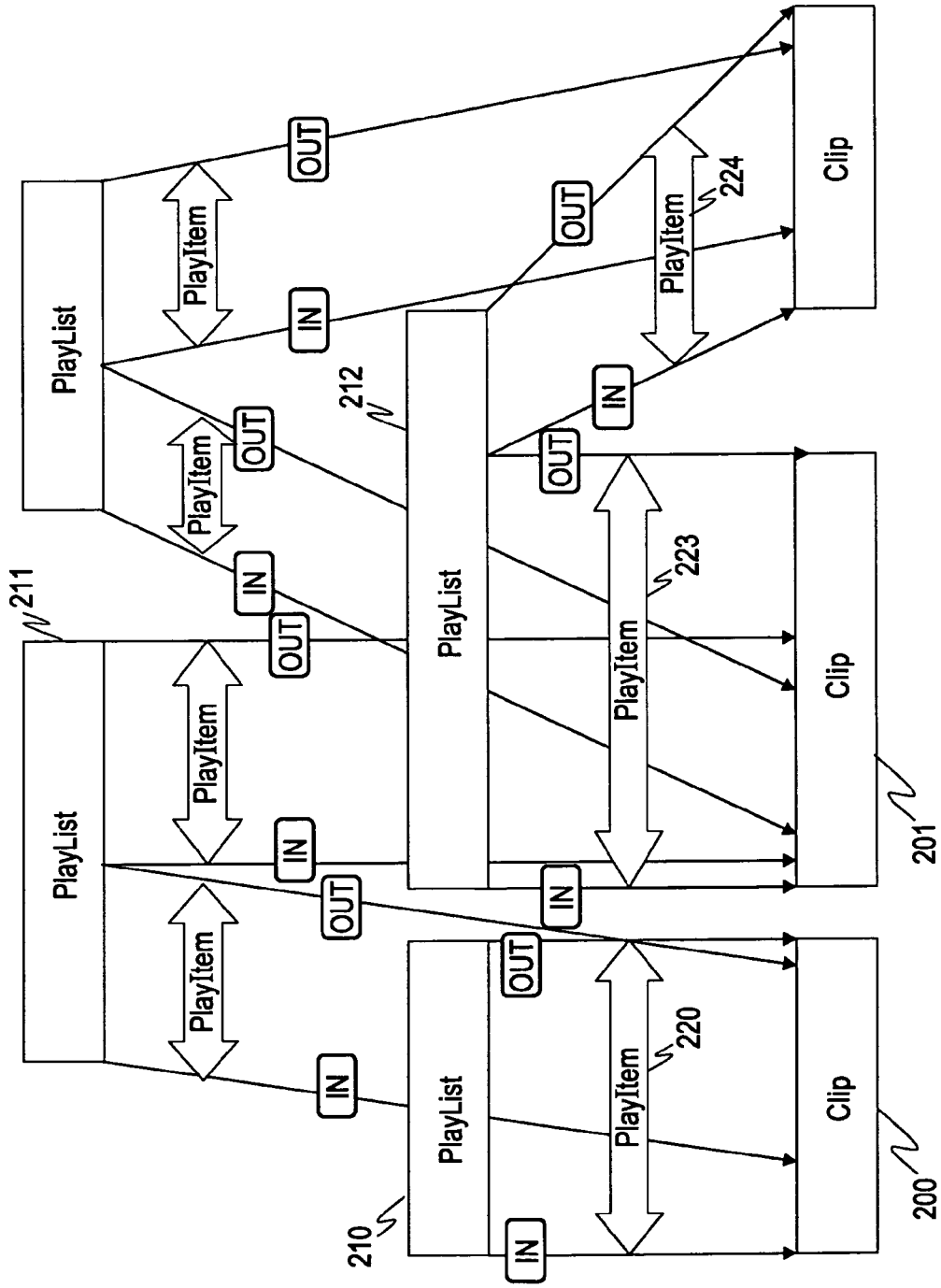
FIG. 4 illustrates reference relationship between the play list and the clip.

With reference to FIG. 4, the same clip may be referenced from a plurality of play lists. Alternatively, a plurality of clips may be referenced from a single play list. The clip may be referenced by the IN point and the OUT point indicated in the play item in the play list. As shown in FIG. 4, a clip 200 can be referenced from a play item 220 in a play list 210 while also being referenced from a play item 221 out of play items 221 and 222 in a play item 211 in accordance with a play period defined by an IN point and an OUT point. A clip 201 is referenced by a play item 222 in the play list 211 in accordance with a play period defined by an IN point and an OUT point. The clip 201 is also referenced in accordance with a period defined by an IN point and an OUT point of the play item 223 out of play items 223 and 224 in a play list 212.

Figure 5:
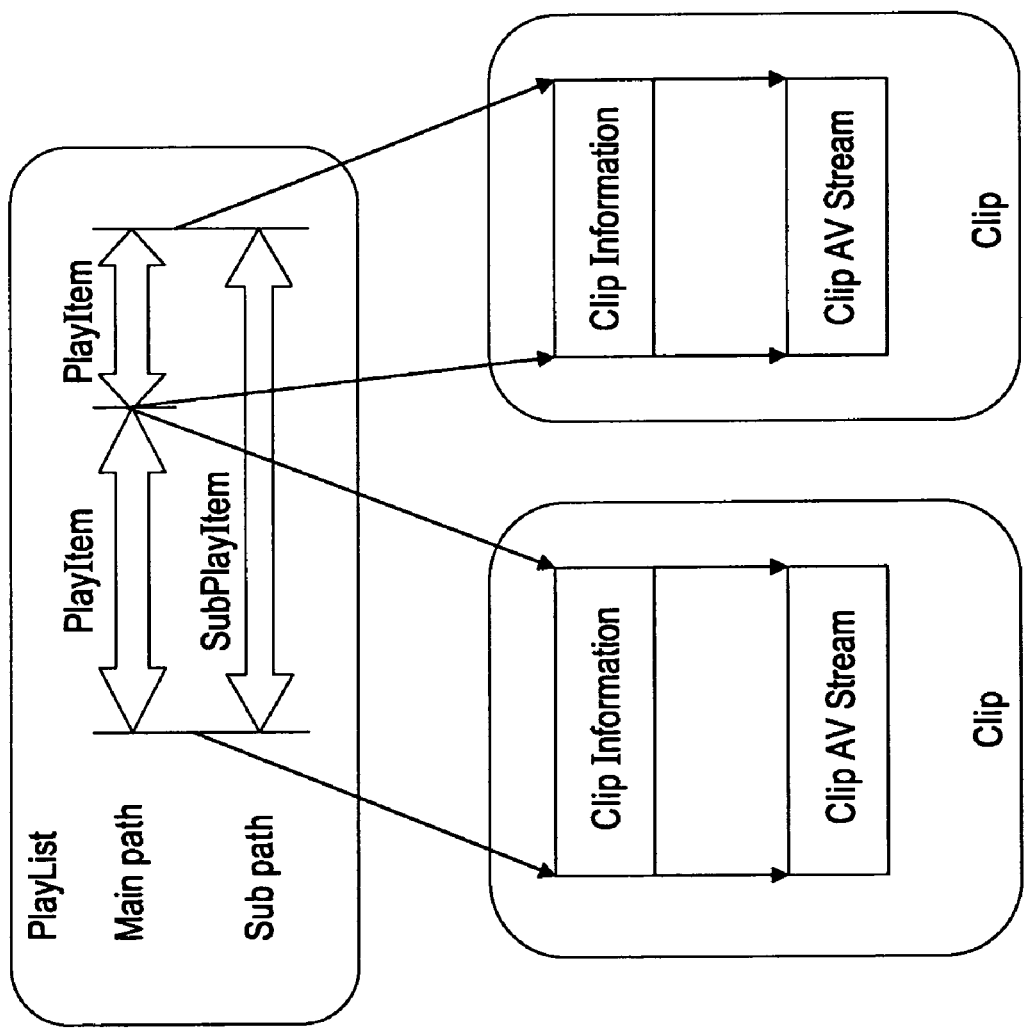
FIG. 5 illustrates relationship between a play list having a main path and a sub path and a clip.

As shown in FIG. 5, the play list can have a sub path corresponding to a sub play item as opposed to a main path corresponding to a play item mainly being played. For example, an after-recording play item attached to a play list may be handled as a sub play item. The play list can have a sub play item only when certain conditions are satisfied.

Figure 6:
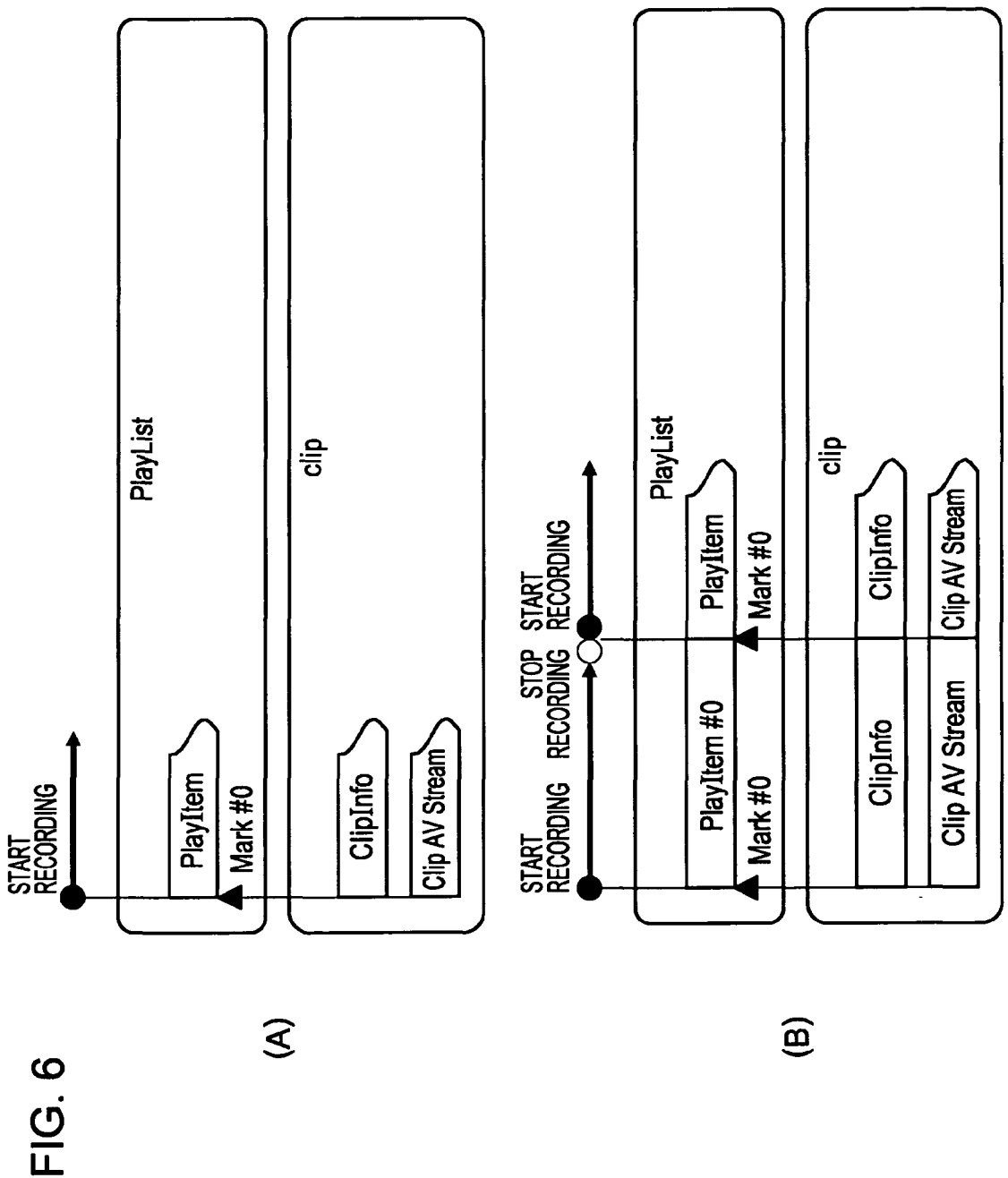
FIG. 6 illustrates a procedure according to which a clip of AV stream and a play list are produced when picture is recorded or picked up by a video camera.
Figure 7:
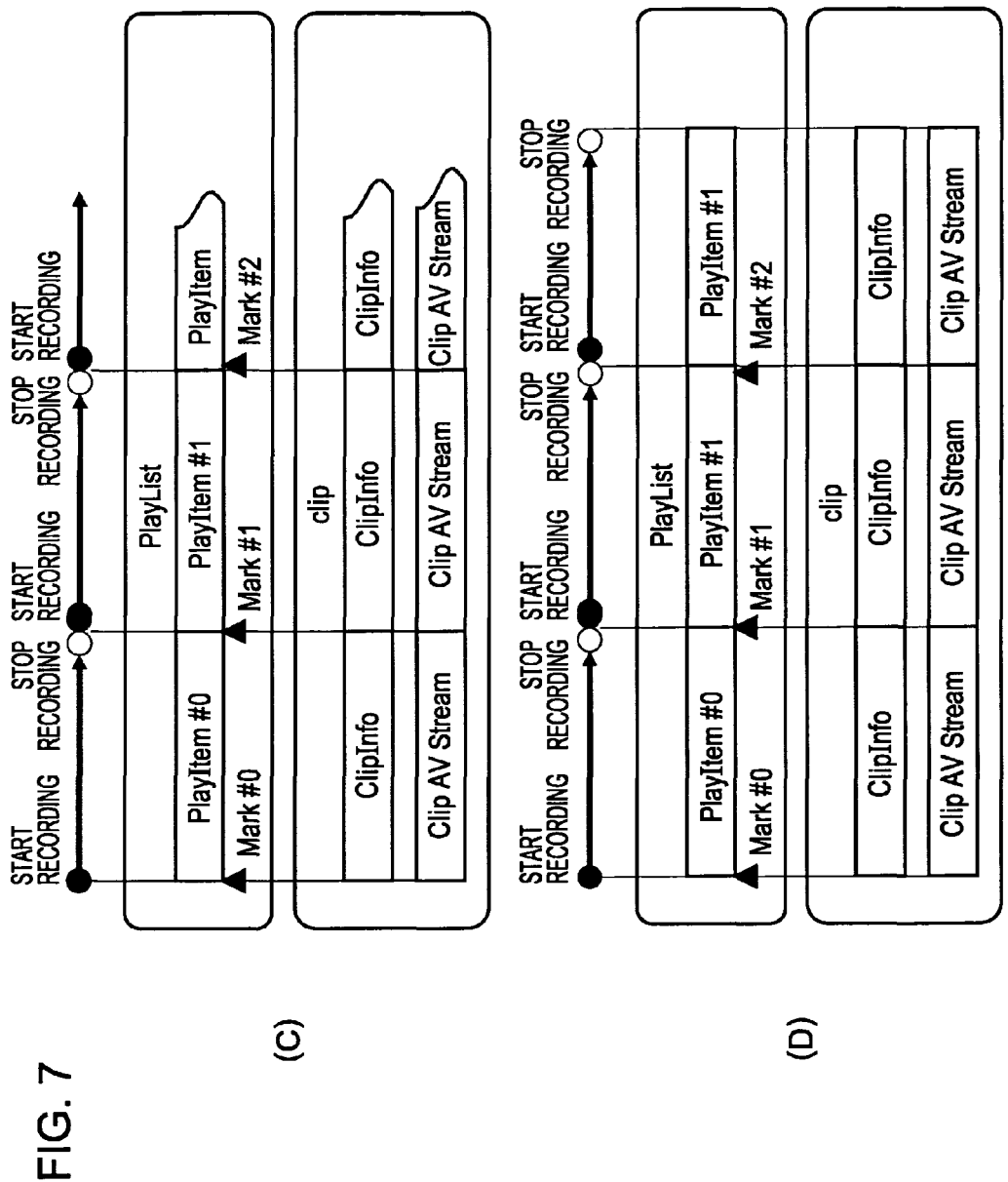
FIG. 7 illustrates a procedure according to which a clip of AV stream and a play list are produced when picture is recorded or picked up by a video camera.

A procedure of generating a play list together with a clip of an AV stream in response to recording and photographing operations of the video camera is described with reference to FIGS. 6 and 7.

FIGS. 6(a) and 6(b) and FIGS. 7(c) and 8(d) illustrate a generation process of the clip and the play list when the user repeats start and stop of a recording process in the order (a) through (d). As shown in FIGS. 6 and 7, one play item is successively generated in each period lasting from when the user starts recording to when the user stops recording. One clip AV stream file is generated in one period of the stream recorded or photographed. Along with the clip AV stream file, the clip information file is also generated. One clip is one unit that guarantees continuous synchronization playing, namely, real-time playing.

Each time the user starts recording, a mark as an entry mark is attached to the front of the play item (the entry mark within the play list is referred to as "play list mark (PLM)." Each play item and mark are tagged with consecutive sequence numbers in one play list. It is required that the entry mark is attached to the front of the play list of a moving image, but a predetermined editing operation can shift the position of the entry mark along time axis.

The entry mark is an entry position through which the user can access the stream. Periods delimited by the consecutive entry marks (and a period from a last mark to the end of last play item) are minimum editing units recognized by the user, namely, "chapters." The play order of the play lists is defined by arranging play items and entry marks in the play order.

When the play list is played, continuous playing may be performed across two AV streams. In this case, the internal buffer of the encoder can be overflown. A next stream is played after the playing of a first stream has been completed. For this reason, screen is frozen at the switch of stream.

By performing the process with the seamless information applied as discussed previously, "seamless playing" for continuous playing straddling consecutive streams is performed. To produce the seamless playing streams, the seamless information containing the buffer status and the time information is stored at the end of the recording of a preceding AV stream and set to be ready for use. The seamless information is described in detail below.

TABLE 2

| Information | Content |
| --- | --- |
| VIDEO INPUT BUFFER VALUE | Accumulated amount at STD Video Buffer at preceding recording [Bytes] |
| AUDIO INPUT BUFFER VALUE | Accumulated amount at STD Audio Buffer at preceding recording [Bytes] |
| VIDEO END PTS | PTS of Video at preceding recording [90 kHz] |
| AUDIO END PTS | PTS of Audi at preceding recording [90 kHz] |
| VIDEO END DTS | PTS of Video at preceding recording [90 kHz] |
| END SCR BASE | SCR value at preceding recording [90 kHz] |
| END SCR EXT | Fraction of SCR value at preceding recording [90 kHz] |

VIDEO INPUT BUFFER VALUE and
AUDIO INPUT BUFFER VALUE are
buffer accumulated amounts of video and audio at the end of the recording operation of the internal buffer (STD buffer) 121 in the encoder 102 of FIG. 1, respectively.

VIDEO END PTS and
AUDIO END PTS are
last set information of the present time stamp PTS at the end of the recording operation, in other words, are attribute information of the video and audio data set as time information of play timings.

VIDEO END DTS is
decoding time stamp (DTS) set at the end of the recording operation, in other words, is attribute information for data set as time information of decoding process timing.

END SCR BASE and
END SCR EXIT is
system clock reference (SCR) as time reference information at the end of the recording operation.

If the title of the content, namely, one play list is composed of a plurality play items, connection condition (CC) to an immediately preceding play item indicating whether continuous playing is possible or not is described in the play item. If connection to subsequent clip information is described as Connection Condition=5, the clip information has a description of connection condition, namely, the file name of the subsequent ClipInformation and Connection Condition=5.

[3. Summary of Typical Recording Process of Seamless Playable Content Data]

As previously described, the AVCHD format defines a variety of connection modes of a plurality of different clips as a connection condition (CC: connection_condtion). For example, a variety of clip connection modes is defined by CC=1 through 6. From among a plurality of connection conditions (CC), CC=5 and CC=6 are defined as connection modes between clips for seamless playing.

CC=5 represents a seamless state in which a boundary called a clean break is present, and CC=6 represents a state in which streams are completely continuous without a boundary called a clean break. For example, in the case of CC=5 of the seamless state in which the boundary called the clean break is present, an identifier of a subsequent clip information file needs to be recorded in a clip information file storing attribute information of a clip set for a preceding clip. During seamless playing, the subsequent clip is acquired smoothly in accordance with the recorded information.

Figure 8:
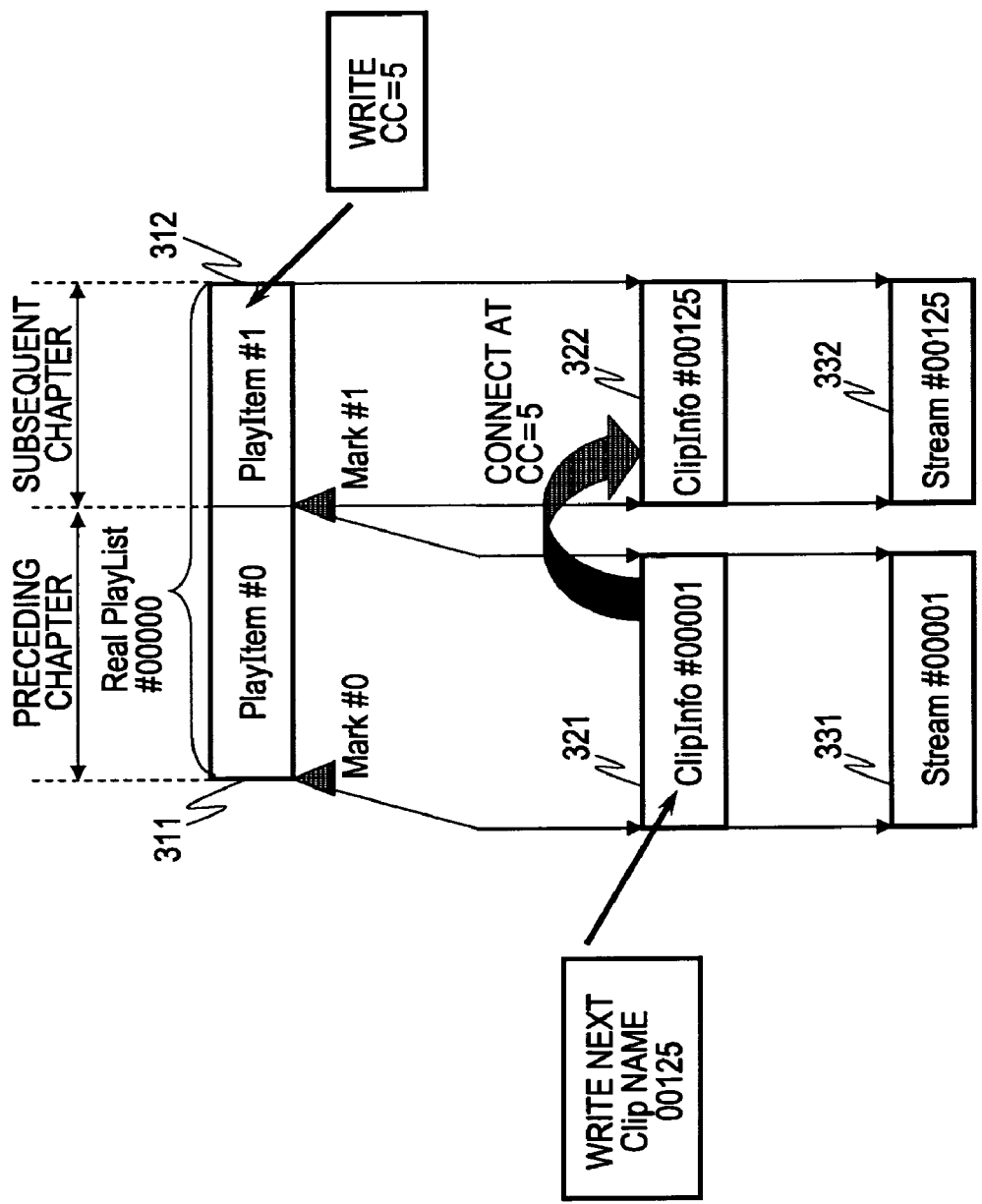
FIG. 8 illustrates a variety of set information with CC=5.

A variety of information setting examples with CC=5 is described with reference to FIG. 8. FIG. 8 illustrates a structure of two consecutive seamless playable chapters [a preceding chapter and a subsequent chapter]. More specifically, FIG. 8 illustrates two play items [PlayItem#0] 311 and [PlayItem#1] 312 contained in one play list [#00000], and a clip information file [ClipInfo#00001] 321 and a clip information file [ClipInfo#00125] 322, respectively corresponding to the two play items, and a stream file [#00001] 331 and a stream file [#00001] 332 respectively corresponding to the two clip information files.

Two stream files contained in different clips, namely, the stream file [#00001] 331 and the stream file [#00001] 332, are set as seamless playable contents. More specifically, the files are data connected with connection condition: CC=5 defined in the AVCHD format. To record the thus set data, CC=5 is recorded in the play item [PlayItem#1] 312 corresponding to the clip of the subsequent content, and an identifier [0125] of the clip information file [ClipInfo#00125] 322 of the subsequent content is recorded in the clip information file [ClipInfo#00001] 321 of the preceding content.

As previously discussed, the recording process of the identifier of the subsequent clip information file is performed subsequent to the selection of the subsequent clip information file during the data recording. The process sequence of the recording process is described below with reference to a flowchart of FIG. 9.

Figure 9:
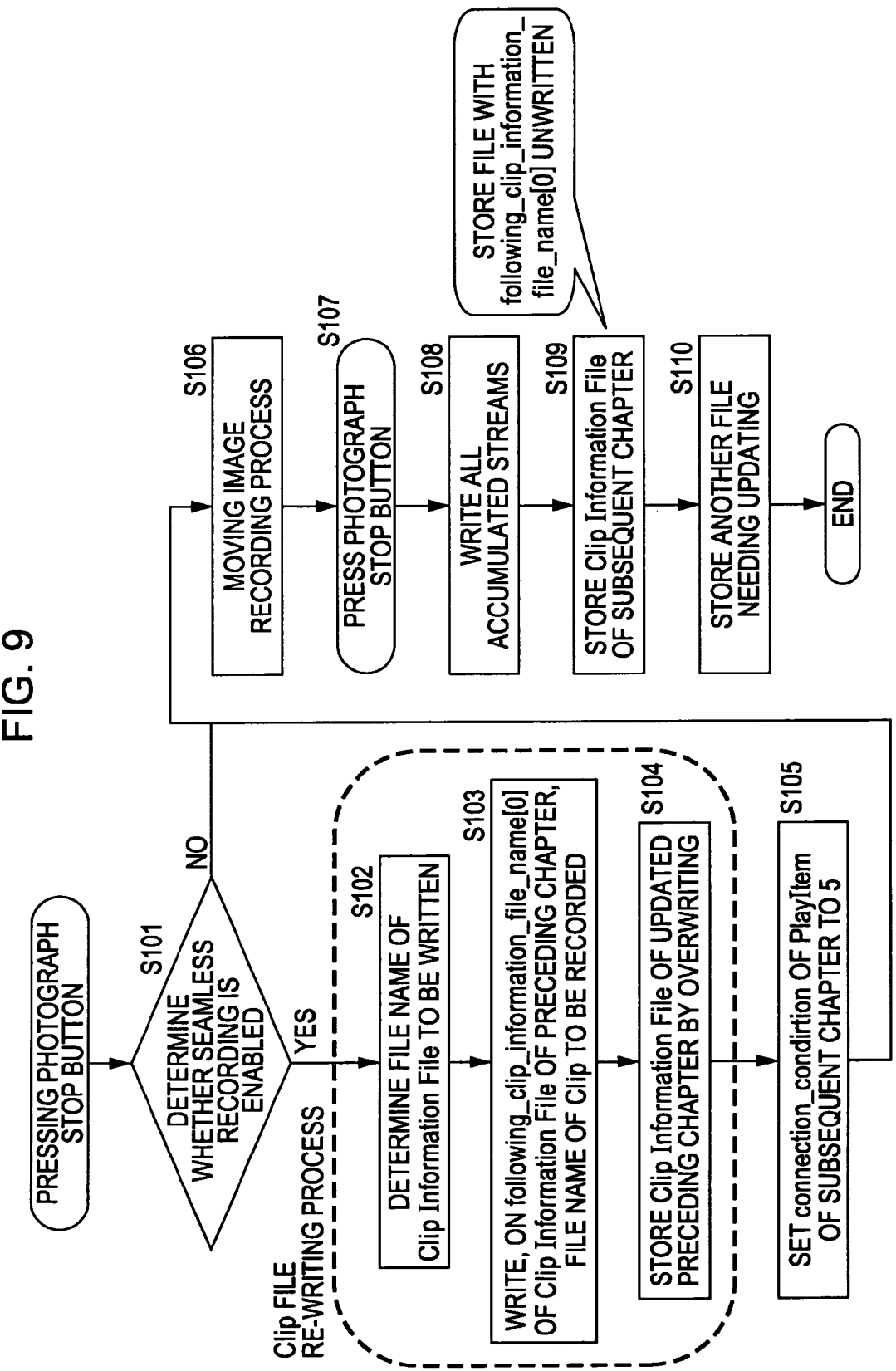
FIG. 9 illustrates a process sequence of a recording process of a subsequent clip information file identifier performed subsequent to a selection of a subsequent clip information file.

The flowchart of FIG. 9 illustrates the process sequence performed when the content of a subsequent chapter is recorded subsequent to the end of the recording of the content of a preceding chapter. When a photograph button is pressed, it is determined in step S101 whether seamless recording is possible. The seamless recording is to record a seamless playable content. Step S101 is to determine whether additional writing to a play list as a candidate applied in information recording, namely, the same play list as the one used in a last recording process is possible. To record seamless playable data, each clip needs to be set as the one falling in the same play list. If the number of play items reaches the maximum number of play items settable in the play list, or if a preceding record content is different in video attribute from a subsequent record content, content recording permitting seamless playing becomes impossible. In such a case, additional writing to the same play list is determined to be impossible. Processing proceeds to step S106. A standard recording process with no seamless information applied is performed.

If a photograph stop button is pressed in step S107, all MPEG-ES data stored on a stream buffer is converted to MPEG2-TS data and then recorded on an information recording medium in step S108. In step S109, the clip information file corresponding to the subsequent chapter having undergone the recording process is generated and stored on the information recording medium. In step S110, a file needing updating is updated and then recorded. The data recording process thus ends.

If it is determined in step S101 that additional writing to the same play list is possible, processing proceeds to step S102.

In step S102, the file name of the clip information file [Clip Information File] for the subsequent chapter to be recorded next is determined. In step S103, the identifier of the clip information file for the subsequent chapter determined in step S102 is recorded in the clip information file [Clip Information File] for the preceding chapter. The recording area in this case is a row of the subsequent clip information file name [following_Clip_information_file_name( )] set in the clip information file [Clip Information File]. The specific structure of the clip information file will be described later. In step S104, an updated file having the identifier of the clip information file for the subsequent chapter in step S103 is stored in an overwriting operation.

Steps S102-S104 are the recording process of the subsequent clip information file identifier. By performing this process, the start of the data recording may be delayed. As previously discussed with reference to FIG. 8, the connection condition information [CC=5] is recorded in the play item file of the subsequent chapter in step S105. Processing proceeds to step S106. The recording operation of a seamless playable moving image content is performed. When the seamless playable moving image content is recorded, the seamless information containing last PTS, DTS and SCR of the preceding chapter and accumulated information of internal buffer (STD buffer) 121 in the encoder is acquired from the memory. An encode process and a format conversion process, free from buffer model destruction are performed with a STD buffer model applied. Through such processes, seamless playable stream data can be recorded. Separate internal buffers (STD buffers) 121 may be set for respectively video and audio.

As illustrated in the flowchart of FIG. 9, steps S102-S104, namely, a re-writing operation of the clip information file needs to be performed prior to the start of the recording of the subsequent chapter when a content made of a plurality of seamless playable chapters is recorded. The start of the data recording, such as the photographing operation of the video camera, is thus delayed due to the process.

[4. Detail of the Recording Process of the Seamless Playable Content Data in Accordance with One Embodiment of the Present Invention]

To eliminate the above-described delay in the start of the data recording, the clip information file for the subsequent chapter is reserved at the end of the recording of the subsequent chapter, and the identifier of the clip information file is recorded in the clip information file for the preceding recorded chapter in accordance with the present invention. This reservation operation eliminates the need for performing steps S102-S104 of the flowchart of FIG. 9 at the start of the recording operation of the subsequent chapter. The data recording such as the photograph start operation is quickly performed. More specifically, efficient seamless playing based on the seamless information is performed in a STD (System Target Decoder) in the AVCHD format.

Figure 10:
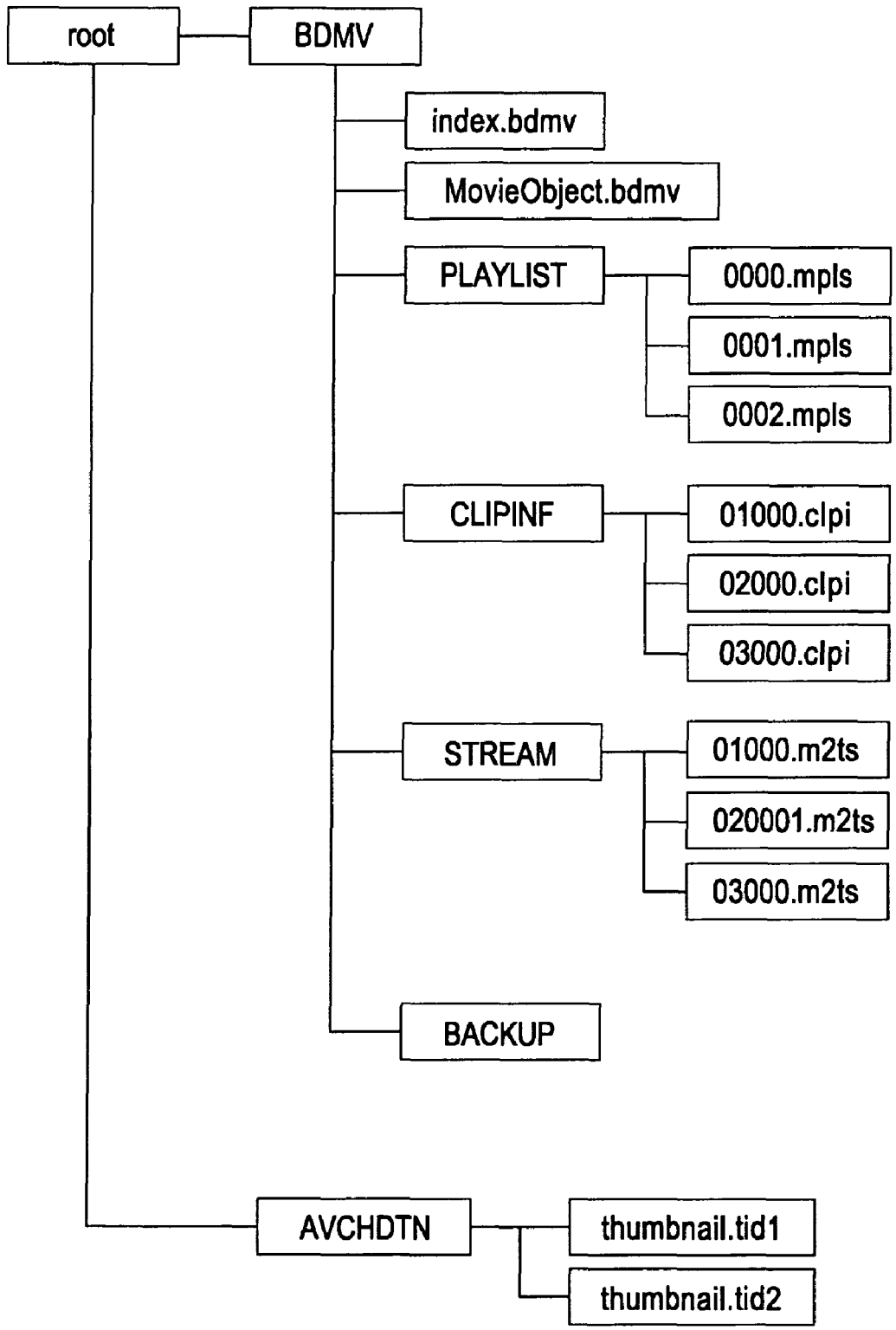
FIG. 10 illustrates a management structure of a file recorded on an information recording medium.

A management structure of a file recorded on the information recording medium is described before the description of a data recording sequence of the present invention. As described with reference to FIGS. 2-4, the data recorded on the information recording medium contains a movie object (MovieObject) file, a play list (PlayList) file, and a clip file. The clip files contain clip information (ClipInformation) file and a clip AV stream (ClipAVStream) file. The management structure of the file to be recorded on the information recording medium is described below with reference to FIG. 10. The files are managed in a layer structure with directories. One directory (root directory as shown in FIG. 10) is produced on the information recording medium. A range under this directory is managed by a single recording and reproducing system.

A directory [BDMV] and a directory [AVCHDTN] are arranged under the root directory. Thumbnail files having a representative image of a clip reduced to a thumbnail size are arranged under the directory [AVCHDTN]. The data structured discussed with reference to FIG. 2 is stored under the directory [BDMV].

Only two files, namely, an index file [indx.bdmv] and a movie object file [MovieObject.bdmv] are permitted to be directly placed under the directory [BDMV]. Directories placed under the BDMV directory [BDMV] are a play list directory [PLAYLIST], a clip information directory [CLIPINF], a stream directory [STREAM] and a directory [BACKUP].

The index file [index.bdmv] describes the content of the directory BDMV. The movie object file [Movieobject.bdmv] contains information of at least one movie object.

The play list directory [PLAYLIST] is a directory of database of the play list. More specifically, the play list directory [PLAYLIST] contains a play list file [xxxxx.mpls] as a file relating to the movie play list. The play list file [xxxxx.mpls] is produced for each movie play list. The "xxxxx" ahead of the period "." in the file name is a five-digital number, and the "mpls" in succession to the period is an extension fixed to this type of file.

The clip information directory [CLIPINF] contains a database of each clip. More specifically, the clip information directory [CLIPINF] contains a clip information file [zzzzz.clpi] for each clip AV stream file. The "zzzzz" ahead of the period "." is a five-digital number and the "clpi" in succession to the period is an extension fixed to this type of file.

The stream directory [STREAM] contains an AV stream file as a body. More specifically, the stream directory [STREAM] contains a clip AV stream file respectively corresponding to each clip information file. The clip AV stream file contains a MPEG2 (Moving Pictures Experts Group 2) transport stream (hereinafter referred to as MPEG2 TS), and the file name thereof is "zzzzz.m2ts." In the file name, the "zzzzz" ahead of the period is the same as the corresponding clip information file so that the clip information file and the clip AV stream file are easily recognized as having correspondence therebetween.

The directory [AVCHDTN] can contain two types of thumbnail files thumbnail.tidx and thumbnail.tdt2. The thumbnail file thumbnail.tidx contains a thumbnail image encrypted through a predetermined method. The thumbnail file thumbnail.tdt2 contains an unencrypted thumbnail image. A thumbnail image corresponding to a clip the user has photographed with a video camera can be freely copied and does not need encryption. Such a thumbnail image can be stored in the thumbnail file thumbnail.tdt2.

In order to eliminate the delay in the start of the data recording, the information processing apparatus of the present invention reserves the clip information file for the subsequent chapter at the end of the recording of the preceding chapter and records the identifier of the clip information file in the clip information file for the preceding record chapter. The prior reservation process of the clip information file eliminates the need for performing steps S102-S104 of the flowchart of FIG. 9 at the start of the recording operation of the subsequent chapter. The data recording such as the photograph start operation is quickly performed.

FIG. 11 illustrates syntax of one example of the clip information file. The syntax here is described based on the C language used to describe programs of computers. The same is true of the other syntax charts.

In the clip information file of FIG. 11, a field [TypeIndicator] having a data length of 32 bits indicates that this file is a clip information file. Each of fields [SequenceInfoStartAddress] to [ExtensionDataStartAddress], having a data length of 32 bits indicates a start address of each data block in this syntax. The start address is represented by the relative number of bytes from the front byte defined in the file.

Clip information blocks [blkClipInfo( )] to clip mark block [blkClipMark( )] contain the actual body of the content of the clip information file. More specifically, these blocks contain information relating to the stream required to play the actual stream.

A extension data block [blkExtensionData( )] is defined when BD-ROM standard is extended to be applied to a recording medium.

With reference to FIG. 12, syntax of the clip information block [blkClipInfo( )] of the clip information file is described. As shown in FIG. 12, the extension data block [blkExtensionData( )} contains clip stream type information [ClipStreamType],
application type information [ApplicationType] and
other variety of types of information.

A connection condition information record field 401 contains the presence or absence of the setting of above-described connection condition information [CC=5]. For example, one-bit information of [1] or [0] is recorded in this field.

The one-bit information [1] recorded in the connection condition information record field 401 indicates that the connection with the subsequent chapter information is continuous with connection condition=5. The connection condition indicates that content (stream file) for the clip information file is seamless connectable with a subsequent content. The one-bit information [0] recorded in the connection condition information record field 401 indicates that the connection with the subsequent chapter information is not connection condition=5. The connection condition indicates that content (stream file) for the clip information file is not seamless connectable with a subsequent content.

In accordance with the present invention, the seamless connection is established between the preceding chapter and the subsequent chapter to eliminate the delay in the start of the data recording. The clip information file for the subsequent chapter is reserved at the end of the recording of the preceding chapter and the identifier of the clip information file is recorded in the clip information file for the preceding record chapter. The clip information block [blkClipInfo( )] of the clip information file of FIG. 12 is structural data of the clip information file corresponding to the preceding record character. If [1] is set in the connection condition information record field 401, the identifier of the clip information file for the subsequent chapter is recorded in the clip information block [blkClipInfo( )] at the end of the preceding record chapter for the clip information file.

A field containing the identifier of the clip information file for the subsequent chapter is a clip information file identifier record field 402 of FIG. 12. The clip information file identifier record field 402 is set when [1] is set in the connection condition information record field [CC=5] 401, and is deleted when [0] is set. If [1] is set in the connection condition information record field [CC=5] 401, the identifier of the clip information file for the subsequent chapter is recorded in the clip information file identifier record field 402.

A rule as to what identifier of the clip information file for the subsequent chapter to select is predetermined. According to the set rule, the information processing apparatus determines the identifier of the clip information file. More specifically, the identifier is determined based on the clip information file number changing in ascending order. For example, the number obtained by adding [+1} to the clip information file number of the selected clip information file for the subsequent chapter is the identifier of the clip information file for the subsequent chapter to be seamless connected, and that identifier is recorded in the clip information file identifier record field 402. A variety of selection rules are available for the identifier of the clip information file. The information processing apparatus selects the identifier according to the rule. The selection rule may be recorded in a content recording processing program, and the information processing apparatus determines the identifier according to the rule.

In the setting of the two chapters discussed with reference to FIG. 8, the clip information block [blkClipInfo( )] of the clip information file 321 for the preceding chapter may be the block of FIG. 12. The clip information file identifier [00125] of the subsequent chapter of FIG. 8 is recorded in the clip information file identifier record field 402.

The information processing apparatus of the present invention reserves the clip information file for the subsequent chapter at the end of the recording of the preceding chapter, and the identifier of the clip information file is recorded in the clip information file of the preceding record chapter. The prior reservation process of the clip information file eliminates the need for performing steps S102-S104 of the flowchart of FIG. 9 at the start of the recording operation of the subsequent chapter. The data recording such as the photograph start operation is quickly performed.

FIG. 13 illustrates syntax of the play list file. As the clip information file discussed with reference to FIG. 11, type information [TypeIndicator] is recorded, followed by start address information of actual data [PlayListStartAddress]-[ExtensionStartAddress], and record fields [blkApplicationPlayList( )]-[blkExtensionData( )] of the actual data to be recorded in the play list file.

FIG. 14 illustrates syntax of a play list information field [blkPlayList( )] as structural data of the play list file. The play list information field contains information relating to the play item set in the play list. As previously discussed with reference to FIG. 5, the play item can contain the sub path for the sub play item as opposed to the main path for the play item mainly played. The play list information field [blkPlayList( )]

contains play item information [blkPlayItem( )] for the main path and play item inforation [blkSubPath( )] for the sub path.

FIG. 15 illustrates play item information [blkPlayLitem( )] contained in the play list information field [blkPlayList( )] as structural data of the play list file.

As previously discussed with reference to FIG. 8, the condition information [CC=n] is recorded in the play item contained in the play list, and the connection setting is thus determined. As shown in FIG. 15, information such as an identifier [ClipInformationFileName] of the corresponding clip information file, and a clip code identifier [ClipCodecIdentifier], is recorded in the play item information [blkPlayItem( )]. The connection condition information [CC=n] is recorded in a connection condition information record field 421.

Recorded in the play item information [blkPlayItem( )] are actual data such as a play start point (IN point) and a play end point (OUT point) of the clip discussed with reference to FIGS. 2 and 4 and pointing information [IN_time] and [OUT_time] of the play end point (OUT point).

At the end of the recording of the preceding record content, the data processor in the information processing apparatus of the present invention performs a control operation, recording in the attribute information storage file for the preceding record content the identification information of the attribute information storage file for the subsequent record content to be recorded next. More specifically, at the end of recording of the preceding record content, the data processor performs the control operation, recording, in the attribute information storage file (clip information file) for the preceding record content, information (CC=5) indicating that the preceding record content and the subsequent record content to be recorded next are to be played in a seamless fashion and the identification information of the attribute information storage file for the subsequent record content.

The data processor in the information processing apparatus of the present invention performs the recording operation in accordance with the AVCHD format. The data processor performs the control operation, converting the record content into a record content having a record format, the record format containing a content file of the record content having a predetermined unit, an attribute information storage file (clip information file) mapping play time information of the content file to address information and a play list file (play list) composed of at least one piece of play period data (play item) specifying a play period of the record content by a start point and an end point, and recording the converted record content in the record format on the information recording medium.

A recording process of the seamless playable content data in accordance with one embodiment of the present invention is described below with reference to a flowchart of FIG. 16. To eliminate the delay in the start of the data recording in accordance with the present invention, the clip information file for the subsequent chapter is reserved at the end of the recording the preceding chapter and the identifier of the clip information file is recorded in the clip information file for the preceding chapter.

Figure 16:
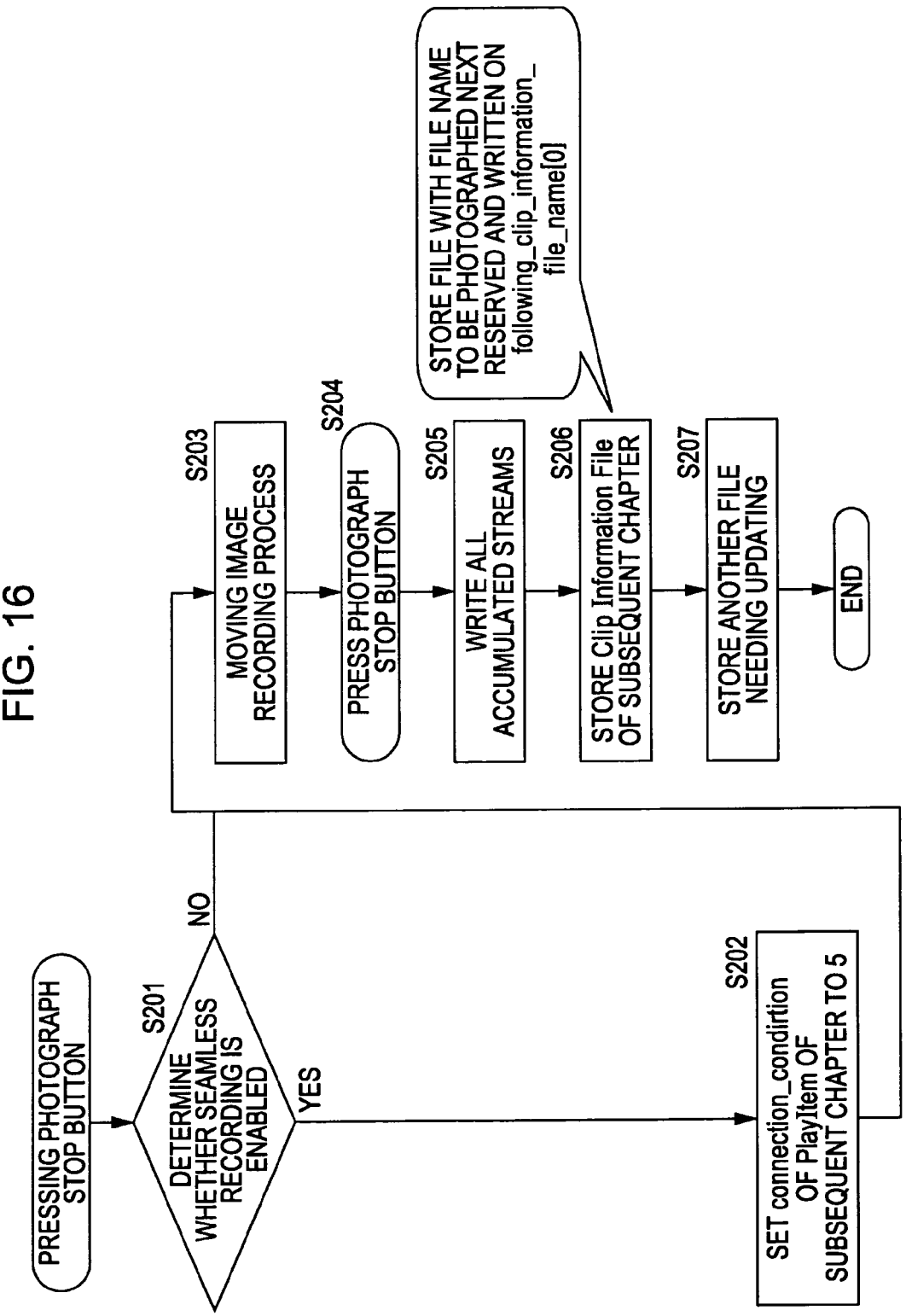
FIG. 16 is a flowchart illustrating a sequence of the recording process of seamless playable content data in accordance with one embodiment of the present invention.

FIG. 16 illustrates a process sequence that is performed under the control of the data processor in the information processing apparatus of the present invention. The process sequence is executed to record the content of the subsequent chapter after completing the recording of the content of the preceding chapter. The difference between the flowchart of FIG. 16 and the flowchart of FIG. 9 previously discussed is that clip information re-write operation in steps S102-S104 of FIG. 9 is not included in the flowchart of FIG. 16.

The steps of the flowchart of FIG. 16 are described below. When a photograph button is pressed, it is determined in step S201 whether seamless recording is possible. The seamless recording is to record a seamless playable content. Step S201 is to determine whether additional writing to a play list as a candidate applied in information recording, namely, the same play list as the one used in a last recording process is possible. To record seamless playable data, each clip needs to be set as the one falling in the same play list. If the number of play items reaches the maximum number of play items settable in the play list, or if a preceding record content is different in video attribute from a subsequent record content, content recording permitting seamless playing becomes impossible. In such a case, additional writing to the same play list is determined to be impossible. Processing proceeds to step S203. A standard recording process with no seamless information applied is performed.

If the photograph stop button is pressed in step S204, all MPEG-ES data stored on a stream buffer is converted to MPEG2-TS data and then recorded on an information recording medium in step S205. In step S206, the clip information file corresponding to the subsequent chapter having undergone the recording process is generated and stored on the information recording medium. In step S207, a file needing updating is updated and then recorded. The data recording process thus ends.

In the generation process of the clip information file in step S206, information indicating that the connection condition with a subsequent clip information file that can be photographed is connection condition=5 and the identifier of the subsequent clip information file are set in the clip information file for the photographed chapter. More specifically, the identifier of the clip information file for the subsequent chapter that is going to be recorded is recorded in the clip information file identifier field of the clip information file previously discussed with reference to FIGS. 11 and 12.

If it is determined in step S201 that additional writing to the same play list is possible with seamless recording enabled, processing proceeds to step S202. In step S202, the connection condition information [CC=5] is recorded in the play item file of the subsequent chapter as previously discussed with reference to FIG. 8. More specifically, the connection condition information [CC=5] is recorded in the connection condition record field 421 in the play item information of FIG. 15. Processing proceeds to step S203. A seamless playable moving image content is recorded. When the seamless playable moving image content is recorded, the seamless information containing last PTS, DTS and SCR of the preceding chapter and accumulated information of internal buffer (STD buffer) 121 in the encoder is acquired from the memory. An encode process and a format conversion process, free from buffer model destruction are performed with a STD buffer model applied. Through such processes, seamless playable stream data can be recorded.

If a photograph stop button is pressed in step S204, all MPEG-ES data stored on a stream buffer is converted to MPEG2-TS data and then recorded on an information recording medium in step S205. In step S206, the clip information file corresponding to the subsequent chapter having undergone the recording process is generated and stored on the information recording medium. In step S207, a file needing updating is updated and then recorded. The data recording process thus ends.

When the clip information file is generated in step S206, [1] is set in the connection condition information record field [CC=5] 401 in the clip information file. The connection condition with the subsequent clip information is set to ConnectionCondtion=5. As previously described, the identifier of the subsequent clip information file that can be photographed later is recorded in the clip information file identifier record field 402 of the clip information file for the photographed chapter. More specifically, the identifier of the clip information file for the chapter going to be recorded is recorded in the clip information file identifier record field of the clip information file discussed with reference to FIGS. 11 and 12.

The information processing apparatus of the present invention eliminates the need for steps S202-S204 of FIG. 9 performed at the start of recording of the subsequent record content. In steps S202-S204, the information indicating the seamless playing for the chapter to be recorded next in the connection condition [CC=5] is set in the clip information file for the preceding record content, and the clip information file identifier for the subsequent record content is recorded in the clip information file for the preceding record content. Quick data recording and photographing operations are thus enabled. With this arrangement, a photographer can enjoy more photo opportunities with the video camera.

The information processing apparatus of the present invention records the identifier of the clip information file to be recorded next in the clip information file of the recorded content (chapter) at the end of recording of given data. The identification may be left as is. When the seamless playable moving image content is recorded as previously discussed, the seamless information containing last PTS, DTS and SCR of the preceding chapter and accumulated information of internal buffer (STD buffer) 121 of FIG. 1 in the encoder is acquired from the memory 107. An encode process and a format conversion process, free from buffer model destruction are performed with a STD buffer model applied. A content with seamless playing enabled cannot be recorded without the seamless information left in the memory 107.

When the seamless information is deleted from the memory 107, for example, when power is turned off, or when the information recording medium recording contents is ejected, the identifier of the clip information file to be recorded next, if recorded in the clip information file, becomes useless. At the timing the seamless information is deleted from the memory, the identifier of the next clip information file recorded in the clip information file may be also deleted.

FIG. 17 is a flowchart illustrating of a sequence to be performed under the control of the data processor in the information processing apparatus of the present invention. FIG. 17 illustrates the clip information file update process that is performed when the information recording medium is removed in response to an eject button on the information processing apparatus. The data processor determines in step S301 whether reservation information of a file name for seamless recording is recorded. More specifically, the data processor determines whether the identifier of the clip information file for the chapter to be recorded next is recorded in the clip information file described with reference to FIGS. 11 and 12, namely, the clip information file identifier record field of the clip information file for last record chapter. If it is determined that the identifier is not recorded, updating of the clip information file is not necessary, and processing thus ends.

If it is determined that the identifier of the clip information file for the chapter to be recorded next is recorded in the clip information file identifier record field of the clip information file for last record chapter, processing proceeds to step S302. In step S302, [0] is set in the connection condition information record field (CC=5) 401 of the clip information file for last record chapter. More specifically, information setting is updated to the setting that the clip is not a record clip of the seamless playing content with the connection condition [CC=5]. With this updated setting, the clip information file identifier for the subsequent chapter recorded in the clip information file identifier record field 402 is deleted. In step S303, the clip information file with the data thereof updated is recorded onto the information recording medium. Processing thus ends.

FIG. 17 illustrates the process responsive to an ejection operation. The clip information file update process may be performed at one of a variety of timings such as when power is off, or when the seamless information is deleted from the memory.

[5. Structure of the Information Processing Apparatus]

FIG. 18 illustrates a hardware structure of the information processing apparatus. The information processing apparatus having the information recording medium processes the data, thereby performing the data recording process. An information processing apparatus 800 includes a drive 890 for driving a recording medium 891 to output a record signal and input a play signal, a CPU 870 for processing data in accordance with a variety of programs, a ROM 860 as a recording area for a program and parameters, a memory 880, an input-output I/F 810 for input and outputting digital signals, an input-output I/F 840 having A/D and D/A converts 841 for inputting and outputting analog signals, an MPEG codec 830 for performing an encode process and a decode process on MPEG data, TS processing means 820 for performing TS (Transport Stream) process and a bus 801 interconnecting all these elements.

The data recording process is described below. One of two signals, namely, a digital signal and an analog signal may be input. The digital signal may be input via the input-output I/F 810, and is converted into storage format data through the MPEG codec 830, the CPU 870 and the TS processing means 820. The resulting data is stored on the recording medium 891.

The analog signal is input to the input-output I/F 840. The A/D and D/A converters 841 convert the analog signal into a digital signal. The MPEG codec 830 codec converts the digital signal. The TS processing means 820 converts the output from the MPEG codec 830 into data in the record format and then stores the resulting data onto the recording medium 891.

A program for executing the information recording process is stored on the ROM 860. In the middle of the execution of the program, a memory 880 is used to store parameters and data and serves as a working area.

The present invention has been discussed in detail with reference to the particular embodiments. The embodiments of the present invention can be changed or modified without departing from the scope of the present invention. The embodiments of the present invention have been discussed for exemplary purposes only, and the present invention is not intended to limit to the disclosed embodiments. The scope of this invention is determined solely by reference to the claims.

The series of process steps described in this specification may be performed using hardware, software or a combination thereof. If the process steps are performed using software, a program of the software may be installed on a computer mounted in a dedicated hardware or may be installed on a general-purpose computer that can execute a variety of processes.

The program may be pre-stored on a recording medium such as a hard disk or a ROM (Read Only Memory). The program may also be temporarily or permanently stored on a removable recording medium such as one of a flexible disk, a CD-ROM (Compact Disc Read Only Memory), MO (Magneto-optical) disk, a DVD (Digital Versatile Disc), a magnetic disk and a semiconductor memory. The removable recording medium may be supplied as package software.

The program may be installed from the above-described removable recording medium to the computer. The program may be transmitted from a download site to the computer in a wireless fashion or via a network such as LAN (Local Area Network) and the Internet in a wired fashion. The computer receives and installs the program onto a recording medium such as an internal hard disk.

The variety of processes described in this specification are not only performed in the time-series order described above but also in parallel or separately depending on the throughput of the apparatus performing the processes. The word system in this specification refers to a logical set of a plurality apparatuses and does not mean elements contained in the same housing.

INDUSTRIAL APPLICABILITY

In accordance with the present invention, when the information processing apparatus such as a video camera performs a recording process of contents at discontinued recording timings, the identification information of the clip information file for the subsequent record content to be recorded next is recorded in the attribute information storage file set for the preceding record content at the end of recording the preceding record content. More specifically, a clip information file for a subsequent chapter is reserved at the end of recording of a preceding chapter, and an identifier of the clip information file is recorded in the clip information file for the preceding record chapter. Through the prior reservation process of the clip information file, an updating process for updating the clip information file at the start of recording of the subsequent chapter becomes unnecessary. Data recording, such as a photographing operation of a video camera is thus quickly started.

The invention claimed is:

1. An information processing apparatus for recording a record content onto an information recording medium, comprising:
    an encoder for performing an encoding operation on the record content,
    a data processor for performing a conversion operation for converting encoded data on the encoder into data having a predetermined record format, and
    a recording processor for recording onto the information recording medium the data having the predetermined record format generated by the data processor,
    at the end of a recording operation of a preceding record content, after the data processor performs a control operation (i) converting all encoded data obtained by performing the encoding operation on the preceding record content into a preceding record content having the predetermined record format, the predetermined record format containing a content file of the preceding record content having a predetermined unit, and (ii) recording the converted preceding record content in the predetermined record format on the information recording medium, and before the recording operation of the preceding record content ends, the data processor performing as part of the control operation, recording, in an attribute information storage file for the preceding record content, identification information of an attribute information storage file for a subsequent record content to be recorded next.

2. The information processing apparatus according to claim 1, wherein at the end of the recording operation of the preceding record content and before the recording operation of the preceding record content ends, the data processor performs the control operation, recording in the attribute information storage file for the preceding record content, information indicating that the attribute information storage file for the subsequent record content to be recorded next and the attribute information storage file for the preceding record content are connected in a seamless fashion and the identification information of the subsequent attribute information storage file.

3. The information processing apparatus according to claim 1, the attribute information storage file for the preceding record content mapping play time information of the content file to address information and a play list file composed of at least one piece of play period data specifying a play period of the preceding record content by a start point and an end point.

4. The information processing apparatus according to claim 1, wherein the data processor deletes the identification information of the subsequent attribute information storage file recorded in the attribute information storage file for last record content recorded on the information recording medium if seamless information for seamless playing stored on a memory of the information processing apparatus is to be deleted.

5. The information processing apparatus according to claim 4, wherein the seamless information comprises accumulated data amount information of an internal buffer of the encoder at the end of the recording operation of the preceding record content, and time stamp information set in response to the record format generated by the data processor.

6. The information processing apparatus according to claim 5, wherein the seamless information comprises a presentation time stamp (PTS), a decoding time stamp (DTS) and a system clock reference (SCR) as reference time information, each defined in the MPEG format.

7. The information processing apparatus according to claim 4, wherein the seamless playing is performed with the seamless information applied in a STD (System Target Decoder) in an AVCHD format.

8. An information processing method of an information processing apparatus for recording a record content onto an information recording medium, comprising:
    an encoding step of an encoder of performing an encoding operation on the record content,
    a data processing step of a data processor of performing a conversion operation for converting data encoded in the encoding step into data having a predetermined record format,
    a recording processing step of a recording processor of recording onto the information recording medium the data having the predetermined record format generated in the data processing step, and
    at the end of a recording operation of a preceding record content, after the data processor performs a control operation (i) converting all encoded data obtained by performing the encoding operation on the preceding record content into a preceding record content having the predetermined record format, the predetermined record format containing a content file of the preceding record content having a predetermined unit, and (ii) recording the converted preceding record content in the predetermined record format on the information recording medium, and before the recording operation of the preceding record content ends, a file identification information recording step of the data processor of performing as part of the control operation, recording, in an attribute information storage file for the preceding record content, identification information of an attribute information storage file for a subsequent record content to be recorded next.

9. The information processing method according to claim 8, further comprising a step of the data processor of performing the control operation, at the end of the recording operation of the preceding record content and before the recording operation of the preceding record content ends, by recording, in the attribute information storage file for the preceding record content, information indicating that the attribute information storage file for the subsequent record content to be recorded next and the attribute information storage file for the preceding record content are connected in a seamless fashion and the identification information of the subsequent attribute information storage file.

10. The information processing method according to claim 8, the attribute information storage file for the preceding record content mapping play time information of the content file to address information and a play list file composed of at least one piece of play period data specifying a play period of the preceding record content by a start point and an end point.

11. The information processing method according to claim 8, further comprising a step of the data processor of deleting the identification information of the subsequent attribute information storage file recorded in the attribute information storage file for last record content recorded on the information recording medium if seamless information for seamless playing stored on a memory of the information processing apparatus is to be deleted.

12. The information processing method according to claim 11, wherein the seamless information comprises accumulated data amount information of an internal buffer of the encoder at the end of the recording operation of the preceding record content, and time stamp information set in response to the record format generated by the data processor.

13. The information processing method according to claim 12, wherein the seamless information comprises a presentation time stamp (PTS), a decoding time stamp (DTS) and a system clock reference (SCR) as reference time information, each defined in the MPEG format.

14. The information processing method according to claim 11, wherein the seamless playing is performed with the seamless information applied in a STD (System Target Decoder) in an AVCHD format.

15. A non-transitory recording medium on which is recorded a computer program for causing an information processing apparatus to perform a content recording process onto an information recording medium, comprising:

an encoding step of an encoder of performing an encoding operation on the record content, a data processing step of a data processor of performing a conversion operation for converting data encoded in the encoding step into data having a predetermined record format, a recording processing step of a recording processor of recording onto the information recording medium the data having the predetermined record format generated in the data processing step, and at the end of a recording operation of a preceding record content, after the data processor performs a control operation (i) converting all encoded data obtained by performing the encoding operation on the preceding record content into a preceding record content having the predetermined record format, the predetermined record format containing a content file of the preceding record content having a predetermined unit, and (ii) recording the converted preceding record content in the predetermined record format on the information recording medium, and before the recording operation of the preceding record content ends, a file identification information recording step of the data processor of performing as part of the control operation, recording, in an attribute information storage file for the preceding record content, identification information of an attribute information storage file for a subsequent record content to be recorded next.

* * * * *